(12) United States Patent
Marshak et al.

(10) Patent No.: US 8,190,948 B1
(45) Date of Patent: May 29, 2012

(54) HANDLING OUT OF ORDER I/O USING TEMPORAL RELATIONSHIPS OF TRANSMITTED DATA

(75) Inventors: Marik Marshak, Newton, MA (US); Benjamin W. Yoder, Framingham, MA (US); Vadim Longinov, Marlborough, MA (US)

(73) Assignee: EMC Corporation, Hopkinton, MA (US)

( * ) Notice: Subject to any disclaimer, the term of this patent is extended or adjusted under 35 U.S.C. 154(b) by 603 days.

(21) Appl. No.: 12/221,210

(22) Filed: Jul. 31, 2008

(51) Int. Cl.
*G06F 11/00* (2006.01)
*G06F 11/16* (2006.01)

(52) U.S. Cl. ............. 714/18; 714/6.3; 714/15; 709/230

(58) Field of Classification Search .................... 714/18; 709/230, 236
See application file for complete search history.

(56) References Cited

U.S. PATENT DOCUMENTS

| | | | |
|---|---|---|---|
| 5,206,939 A | 4/1993 | Yanai et al. | |
| 5,742,792 A | 4/1998 | Yanai et al. | |
| 5,754,754 A * | 5/1998 | Dudley et al. | 714/18 |
| 5,778,394 A | 7/1998 | Galtzur et al. | |
| 5,845,147 A | 12/1998 | Vishlitzky et al. | |
| 5,857,208 A | 1/1999 | Ofek | |
| 6,418,143 B1 * | 7/2002 | Rezaiifar et al. | 370/394 |
| 7,054,883 B2 | 5/2006 | Meiri et al. | |
| 7,228,456 B2 * | 6/2007 | Lecrone et al. | 714/15 |
| 7,382,733 B2 * | 6/2008 | Banerjee et al. | 370/236 |
| 2001/0032325 A1 * | 10/2001 | Fong et al. | 714/18 |
| 2002/0031126 A1 * | 3/2002 | Crichton et al. | 370/394 |
| 2003/0172181 A1 * | 9/2003 | Sharma | 709/238 |
| 2004/0066742 A1 * | 4/2004 | Varsa et al. | 370/229 |
| 2006/0069887 A1 | 3/2006 | LeCrone et al. | |
| 2009/0109893 A1 * | 4/2009 | Gopal | 370/315 |

* cited by examiner

*Primary Examiner* — Joseph Schell
(74) *Attorney, Agent, or Firm* — Muirhead and Saturnelli, LLC

(57) ABSTRACT

Maintaining an ordering of transmitted data includes associating a sequence number with each element of the transmitted data, where the sequence number indicates a temporal relationship between different ones of the elements. Maintaining an ordering also includes maintaining a last aborted sequence number and an indicator of whether receipt of information indicating that the last aborted sequence number has been acknowledged and rejecting data associated with a sequence number indicative of a time before a time corresponding to the last aborted sequence number. The last aborted sequence number may be sent until receipt thereof is acknowledged. No data may be transmitted until receipt of the last aborted sequence number is acknowledged. The sequence numbers may be incremented by one.

12 Claims, 18 Drawing Sheets

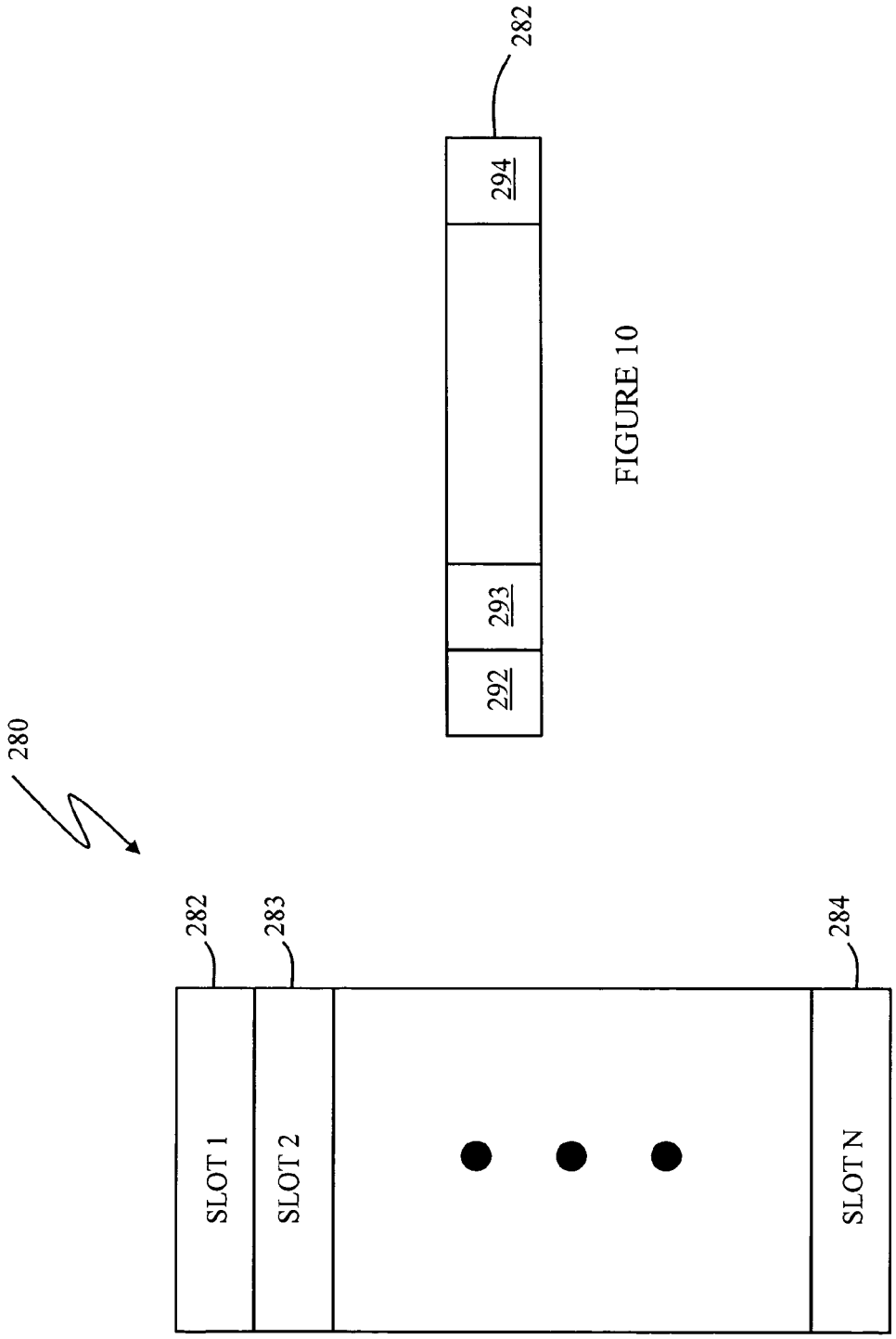

US 8,190,948 B1

HANDLING OUT OF ORDER I/O USING TEMPORAL RELATIONSHIPS OF TRANSMITTED DATA

BACKGROUND OF THE INVENTION

1. Technical Field

This application relates to computer storage devices, and more particularly to the field of transferring data between storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass., and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may not correspond to the actual disk drives.

In some instances, it may be desirable to copy data from one storage device to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by a Remote Data Facility (RDF) product provided by EMC Corporation of Hopkinton, Mass., e.g., Symmetrix Remote Data Facility (SRDF). With RDF, a first storage device, denoted the "primary storage device" (or "R1") is coupled to the host. One or more other storage devices, called "secondary storage devices" (or "R2") receive copies of the data that is written to the primary storage device by the host. The host interacts directly with the primary storage device, but any data changes made to the primary storage device are automatically provided to the one or more secondary storage devices using RDF. The primary and secondary storage devices may be connected by a data link, such as an ESCON link, a Fibre Channel link, and/or a Gigabit Ethernet link. The RDF functionality may be facilitated with an RDF adapter (RA) provided at each of the storage devices.

In some instances, such as when one or more R1 devices are coupled to one or more R2 devices through a network, it is possible for data to arrive at the R2 site out of order. For example, the R1 device(s) may transmit a first packet that is not timely acknowledged by the R2 device(s). In such a case, the R1 device(s) may retransmit the first packet and, if the retransmission is acknowledged by the R2 device(s), the R1 device(s) may then transmit a second, subsequent packet of data. However, if the first (unacknowledged) packet is eventually received at the R2 device(s) after the second packet has been received, then the R2 device(s) may incorrectly overwrite the data from the second packet with the out-of-sequence data from the first packet. Of course, the R2 device(s) may prevent this by using a table (or similar) to keep track of each and every packet that has already been received and discarding duplicates, but doing this may introduce an unacceptable amount of complexity as well as additional processing and overhead storage requirements.

Accordingly, it is desirable to be able to properly handle receipt of out-of-sequence packets without introducing the complexity and overhead associated with keeping track of each and every packet that is successfully received.

SUMMARY OF THE INVENTION

According to the system described herein, maintaining an ordering of transmitted data includes associating a sequence number with each element of the transmitted data, where the sequence number indicates a temporal relationship between different ones of the elements, maintaining a last aborted sequence number and an indicator of whether receipt of information indicating that the last aborted sequence number has been acknowledged, and rejecting data associated with a sequence number indicative of a time before a time corresponding to the last aborted sequence number. The last aborted sequence number may be sent until receipt thereof is acknowledged. No data may be transmitted until receipt of the last aborted sequence number is acknowledged. The sequence numbers may be incremented by one. A sender may send the last aborted sequence number to a receiver that acknowledges receipt thereof. The sender and the receiver may each maintain a value for the last aborted sequence number and the receiver may return the last aborted sequence number to the sender in connection with rejecting data provided thereto. Maintaining an ordering of transmitted data may also include adjusting the sequence number and the last aborted sequence number of the sender in response to the last aborted sequence number of the receiver being different than the last aborted sequence number of the sender. Each of the sender and the receiver may set the last aborted sequence number of each to zero in response to a difference between the sequence number and the last aborted sequence number being greater than a value representing an expected latency of a network interposed between the sender and the receiver. Data may be accepted by the receiver in response to the last aborted sequence number being equal to zero.

According further to the present invention, computer software, provided in a computer-readable medium, maintains an ordering of transmitted data. The software includes executable code that associates a sequence number with each element of the transmitted data, where the sequence number indicates a temporal relationship between different ones of the elements, executable code that maintains a last aborted sequence number and an indicator of whether receipt of information indicating that the last aborted sequence number has been acknowledged, and executable code that rejects data associated with a sequence number indicative of a time before a time corresponding to the last aborted sequence number. The software may also include executable code that sends the last aborted sequence number until receipt thereof is acknowledged. No data may be transmitted until receipt of the last aborted sequence number is acknowledged. The sequence numbers may be incremented by one. Executable code may be provided on a sender and on a receiver to cause the sender to send the last aborted sequence number to the receiver and to cause the receiver to acknowledge receipt thereof. The computer software may also include executable code that causes the sender and the receiver to each maintain a value for the last aborted sequence number and executable code that causes the receiver to return the last aborted sequence number to the sender in connection with rejecting data provided thereto. The computer software may also include executable code that adjusts the sequence number and the last aborted sequence number of the sender in response to the last aborted sequence number of the receiver being different than the last aborted sequence number of the sender.

According further to the present invention, a data storage device maintains an ordering of data transmitted thereto, each of the elements of the data having a sequence number associated therewith. The receiver includes non-volatile memory for storing the data and at least one director, coupled to the non-volatile memory and having at least one processor and computer software in a computer-readable medium, the software including executable code that maintains a last aborted sequence number and executable code that rejects data associated with a sequence number indicative of a time before a time corresponding to the last aborted sequence number. The sequence numbers may be incremented by one. The last aborted sequence number may be set to zero in response to a difference between the sequence number and the last aborted sequence number being greater than a value representing an expected latency of a network to which the data storage device is coupled. Data may not be rejected in response to the last aborted sequence number being equal to zero.

BRIEF DESCRIPTION OF DRAWINGS

Embodiments of the system are described with reference to the several figures of the drawings, noted as follows.

FIG. 9 is a diagram illustrating a plurality of slots for a diskless storage device according to an embodiment of the system described herein.

FIG. 10 is a diagram illustrating in more detail a slot for a diskless storage device according to an embodiment of the system described herein.

DETAILED DESCRIPTION OF VARIOUS EMBODIMENTS

Figure 1:
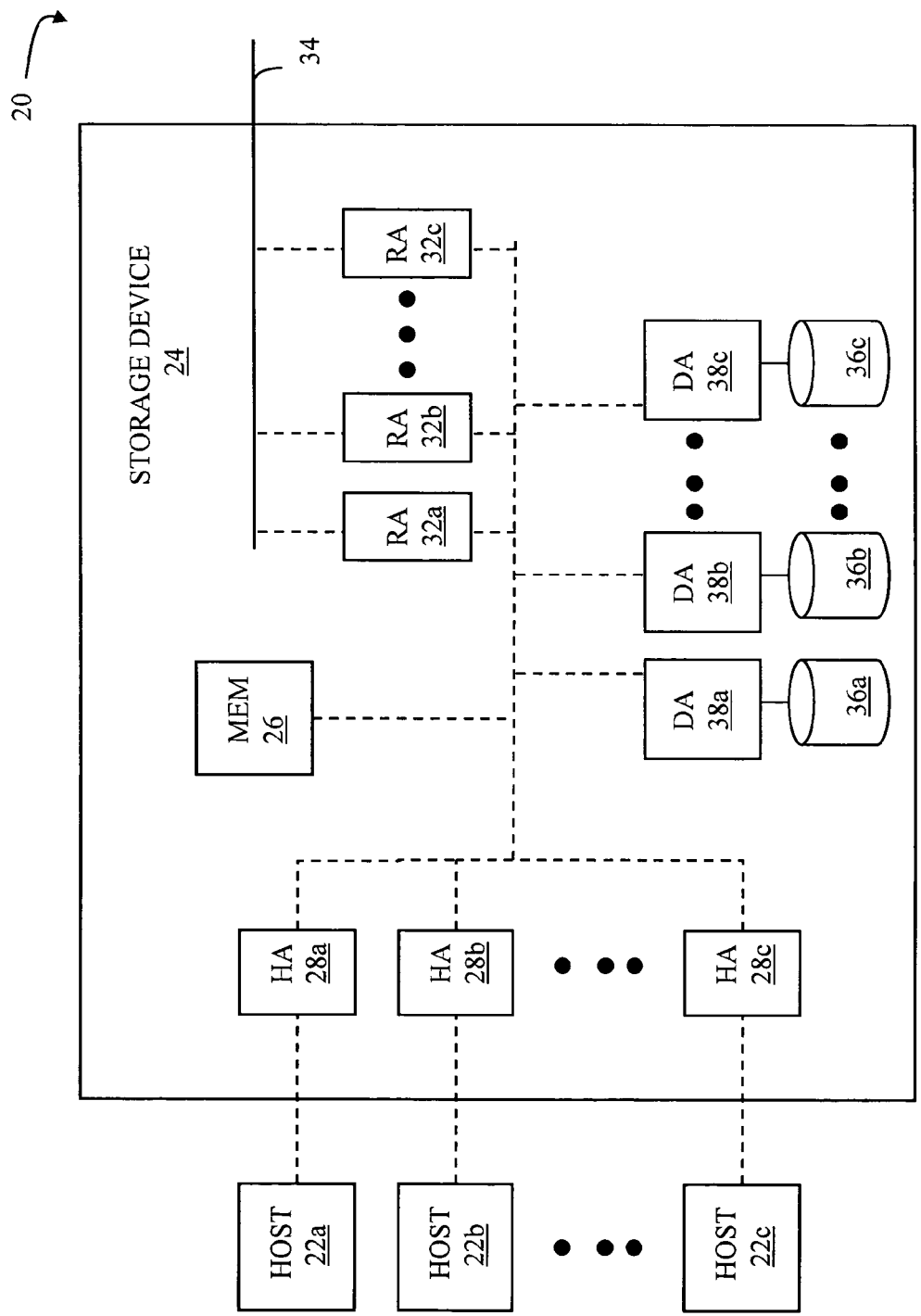
FIG. 1 is a schematic diagram showing a plurality of hosts and a data storage device that may be used in connection with the system described herein.

Referring now to the figures of the drawing, the figures comprise a part of this specification and illustrate exemplary embodiments of the described system. It is to be understood that in some instances various aspects of the system may be shown schematically or may be exaggerated or altered to facilitate an understanding of the system.

Referring to FIG. 1, a diagram 20 shows a plurality of hosts 22a-22c coupled to a data storage device 24. The data storage device 24 includes an internal memory 26 that facilitates operation of the storage device 24 as described elsewhere herein. The data storage device also includes a plurality of host adapters (HAs) 28a-28c that handle reading and writing data between the hosts 22a-22c and the storage device 24. Although the diagram 20 shows each of the hosts 22a-22c coupled to each of the HAs 28a-28c, it will be appreciated by one of ordinary skill in the art that one or more of the HAs 28a-28c may be coupled to other hosts and that one of the hosts 22a-22c may be coupled to more than one of the HAs 28a-28c.

The storage device 24 may include one or more Remote Data Facility (RDF) adapter units (RAs) 32a-32c. An RDF product, such as produced by EMC Corporation of Hopkinton, Mass., may be used to copy data from one storage device to another. For example, if a host writes data to a first storage device (e.g., a local storage device), it may be desirable to copy that data to a second storage device provided in a different location (e.g., a remote storage device). The RAs 32a-32c are coupled to an RDF link 34 and the RAs 32a-32c are similar to the HAs 28a-28c, but are used to transfer data between the storage device 24 and other storage devices (not shown) that are also coupled to the RDF link 34. The storage device 24 may be coupled to additional RDF links (not shown in FIG. 1) in addition to the RDF link 34. For further discussion of RDF and the use thereof in data recovery and storage techniques, see U.S. Pat. No. 5,742,792, which is incorporated by reference herein, and U.S. Patent App. Pub. No. 2006-0069887 to LeCrone, et al., entitled "Triangular Asynchronous Replication," which is incorporated herein by reference.

The storage device 24 may also include one or more disk drives 36a-36c (disk assemblies), each containing a different portion of data stored on the storage device 24. The disk drives 36a-36c should be understood as representing any appropriate type of storage media, including, without limitation, DRAM cache, flash or other solid-state storage device, tape, optical media, and/or any combination of permanent, semi-permanent and temporally-limited storage media. Each of the disk drives 36a-36c may be coupled to a corresponding one of a plurality of disk adapter units (DA) 38a-38c that provides data to a corresponding one of the disk drives 36a-36c and receives data from a corresponding one of the disk drives 36a-36c. Note that, in some embodiments, it is possible for more than one disk drive to be serviced by a DA and that it is possible for more than one DA to service a particular disk drive.

The storage space in the storage device 24 that corresponds to the disk drives 36a-36c may be subdivided into a plurality of volumes or logical storage devices. The logical storage devices may or may not correspond to the physical storage space of the disk drives 36a-36c. Thus, for example, the disk drive 36a may contain a plurality of logical storage devices or, alternatively, a single logical storage device could span both of the disk drives 36a, 36b. The hosts 22a-22c may be configured to access any combination of logical storage devices independent of the location of the logical storage devices on the disk drives 36a-36c. A device, such as a logical storage device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk drive. Other embodiments may use different structures.

One or more internal logical data path(s) exist between the DAs 38a-38c, the HAs 28a-28c, the RAs 32a-32c, and the memory 26. In some embodiments, one or more internal busses and/or communication modules may be used. In some embodiments, the memory 26 may be used to facilitate data transferred between the DAs 38a-38c, the HAs 28a-28c and the RAs 32a-32c. The memory 26 may contain tasks that are to be performed by one or more of the DAs 38a-38c, the HAs 28a-28c and the RAs 32a-32c, and a cache for data fetched from one or more of the disk drives 36a-36c. Use of the memory 26 is described in more detail hereinafter.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device 24 may be coupled to a SAN fabric and/or be part of a SAN fabric. The system described herein may be implemented using software, hardware, and/or a combination of software and hardware where software may be stored in an appropriate storage medium and executed by one or more processors.

Figure 2:
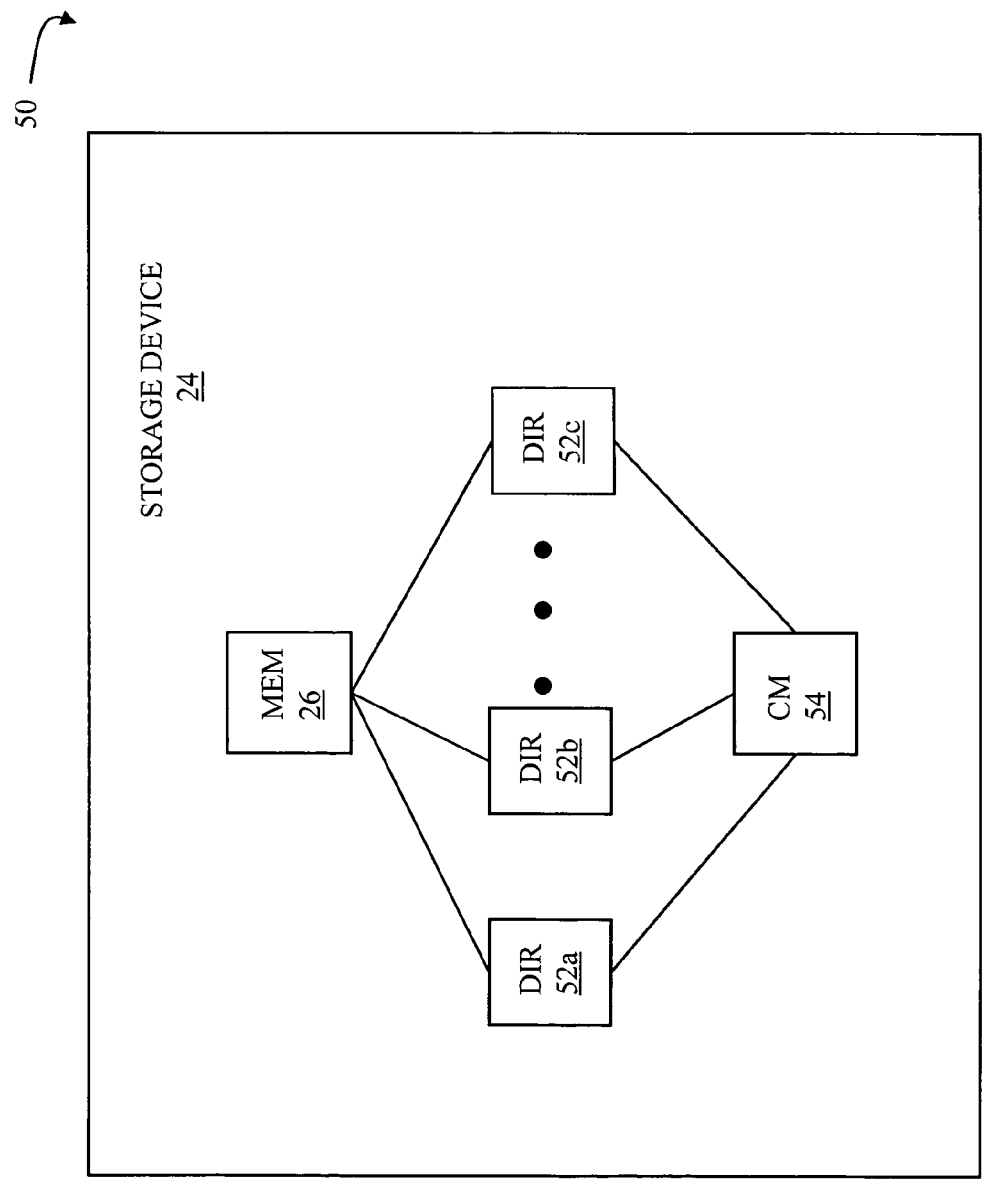
FIG. 2 is a schematic diagram showing a storage device, memory, a plurality of directors, and a communication module that may be used in connection with the system described herein.

Referring to FIG. 2, a diagram 50 illustrates an embodiment of the storage device 24 where each of a plurality of directors 52a-52c are coupled to the memory 26. Each of the directors 52a-52c represents one of the HAs 28a-28c, RAs 32a-32c, or DAs 38a-38c. In an embodiment disclosed herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some embodiments, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at least one type of director and perform other processing with the other processing system. In addition, all or at least part of the global memory 26 may be provided on one or more of the directors 52a-52c and shared with other ones of the directors 52a-52c.

Note that, although specific storage device configurations are disclosed in connection with FIG. 1 and FIG. 2, it should be understood that the system described herein may be implemented on any appropriate platform. Thus, the system described herein may be implemented using a platform like that described in connection with FIG. 1 and FIG. 2 or may be implemented using a platform that is somewhat or even completely different from any particular platform described herein.

Figure 3:
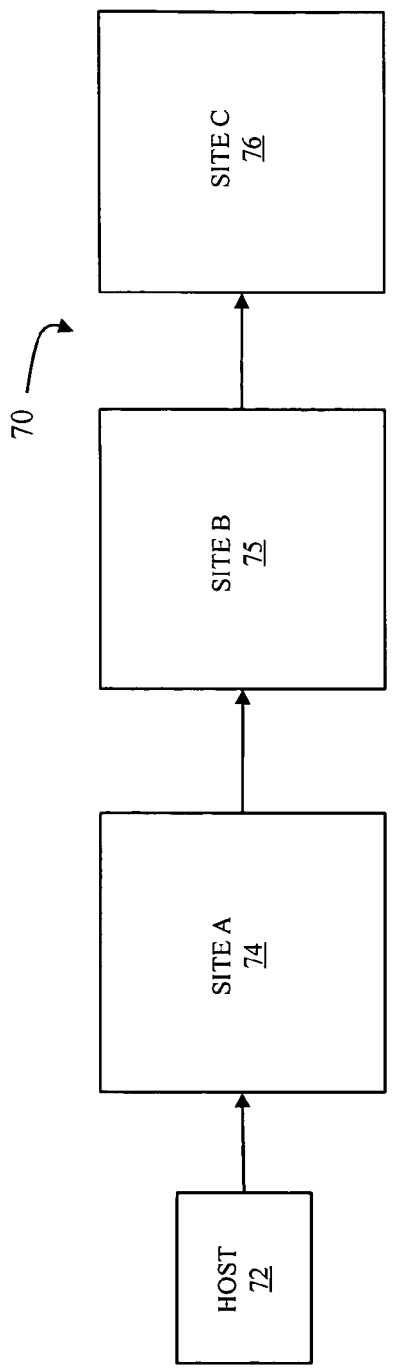
FIGS. 3-5 are diagrams illustrating various cascaded RDF configurations according to an embodiment of the system described herein.

Referring to FIG. 3, a diagram 70 shows a host 72 coupled to a plurality of storage devices 74-76. The storage device 74 may be referred to as "site A" or the local RDF site, the storage device 75 may be referred to as "site B" or the intermediate RDF site, and the storage device 76 may be referred to as "site C" or the remote RDF site. The storage devices 74-76 may be like the storage devices described herein or may be any appropriate devices capable of providing the functionality described herein.

The host 72 is coupled to the storage device 74, which has at least one logical storage device (R1) that the host 72 accesses for reading and writing data. The storage device 74 is coupled to the storage device 75. The storage device 74 includes at least one logical storage device (R21) that has an RDF relationship with the at least one logical storage device (R1) of the storage device 74 such that data written by the host 72 to the logical storage device (R1) of the storage device 74 is propagated to the logical storage device (R21) of the storage device 75 in a manner that is essentially transparent to the host 72, consistent with conventional RDF operation. The logical storage device (R1) that receives writes from the host 72 is a primary logical storage device while the logical storage device (R21) that receives copies of data written to the primary logical storage device is a secondary logical storage device.

The storage device 75 is coupled to the storage device 76, which has at least one logical storage device (R2) that has an RDF relationship with the at least one logical storage device (R21) of the storage device 75 such that data written to the logical storage device (R21) of the storage device 75 is propagated to the logical storage device (R2) of the storage device 76. Data is written to the logical storage device (R21) by virtue of being the secondary device in the R1/R21 RDF relationship between the storage devices 74, 75. Thus, the logical storage device (R21) acts as a secondary logical storage device with respect to the primary logical storage device (R1) of the storage device 74, but acts as a primary logical storage device with respect to the secondary logical storage device (R2) of the storage device 76.

In an embodiment herein, the RDF relationship between the logical storage devices R1/R21 and the RDF relationship between the logical storage devices R21/R2 may be any type of RDF relationship, including synchronous RDF, asynchronous RDF, etc. The asynchronous RDF mechanism may be like that described in U.S. Pat. No. 7,054,883, which is incorporated by reference herein. In some embodiments, the system may not provide an asynchronous RDF connection between R1 and R21 and a simultaneous asynchronous RDF connection between R21 and R2. In some embodiments, the R1/R21 RDF connection may be a synchronous RDF relationship while the R21/R2 connection may be an asynchronous RDF relationship.

Figure 4:
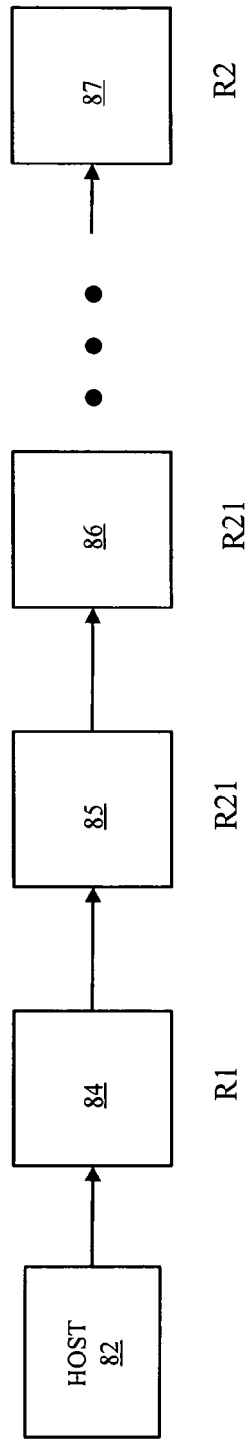

Referring to FIG. 4, a diagram 80 shows a host 82 coupled to a storage device 84 that acts as a local RDF site. The storage device 84 is coupled to another storage device 85, which is coupled to yet another storage device 86. The storage devices 85, 86 act as intermediate RDF sites. Another storage device 87 acts as a remote RDF site. A plurality of additional intermediate RDF sites (not shown) may be interposed between the storage device 86 and the storage device 87. RDF relationships exist such that data written by the host to a logical storage device (R1) of the storage device 84 is propagated through downstream logical storage devices (R21) of the storage devices 85, 86 (intermediate RDF sites) to a logical storage device (R2) of the storage device 87 that acts as a remote RDF site. Note that, generally, a local RDF site is a site couple to a host or other data source, an intermediate RDF site is a site that receives RDF data from another RDF site and propagates the data to one or more downstream RDF sites, and a remote RDF site is a site that receives RDF data but does not propagate the data to any other RDF sites.

Figure 5:
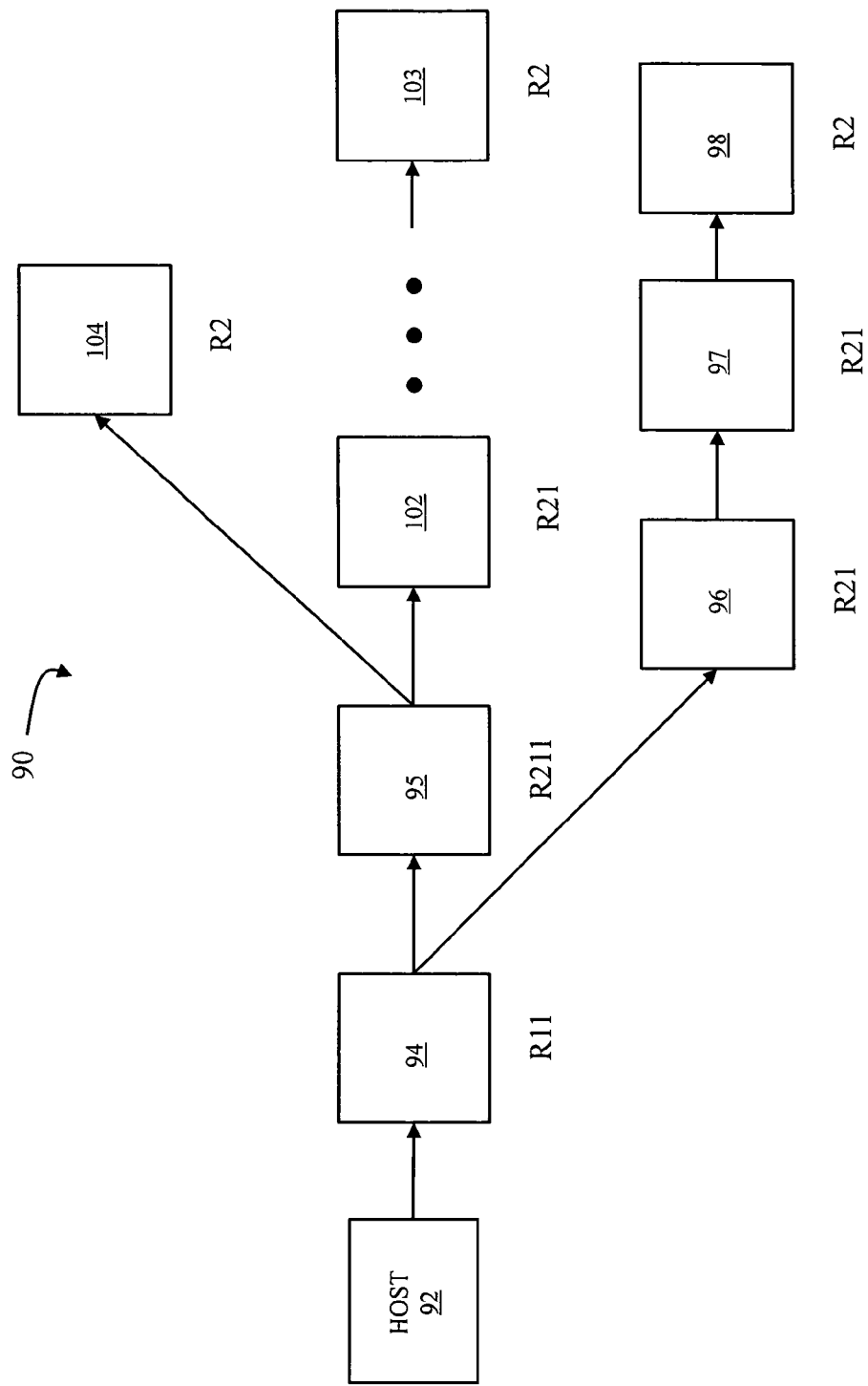

Referring to FIG. 5, a diagram 90 illustrates that there may be other configurations that are relatively more complex than those illustrated by the diagrams 70, 80, discussed above. In the diagram 90, a host 92 is coupled to a storage device 94 that has a logical storage device (R11) that acts primary logical storage device for more than one secondary logical storage device. The storage device 94 is coupled to both the storage device 95 and the storage device 96. The storage device 95 has a logical storage device (R211) that acts as an intermediate RDF site for the storage devices 102, 103, where the storage device 103 acts as a remote RDF site. The logical storage device (R211) also acts as an intermediate RDF site for the storage device 104, which acts as a remote RDF site. The storage device 96 has a logical storage device (R21) that acts as an intermediate site for the storage devices 97, 98, where the storage device 98 acts as a remote RDF site.

In an embodiment herein, local RDF sites and remote RDF sites may perform in a manner similar to conventional two site RDF configurations. That is, local RDF sites may perform like conventional primary (R1) RDF sites while remote RDF sites may perform like conventional secondary (R2) RDF sites. However, as described in more detail below, intermediate RDF sites may include functionality for managing operation that exhibits characteristics of both a primary RDF logical storage device and a secondary RDF logical storage device.

Figure 6:
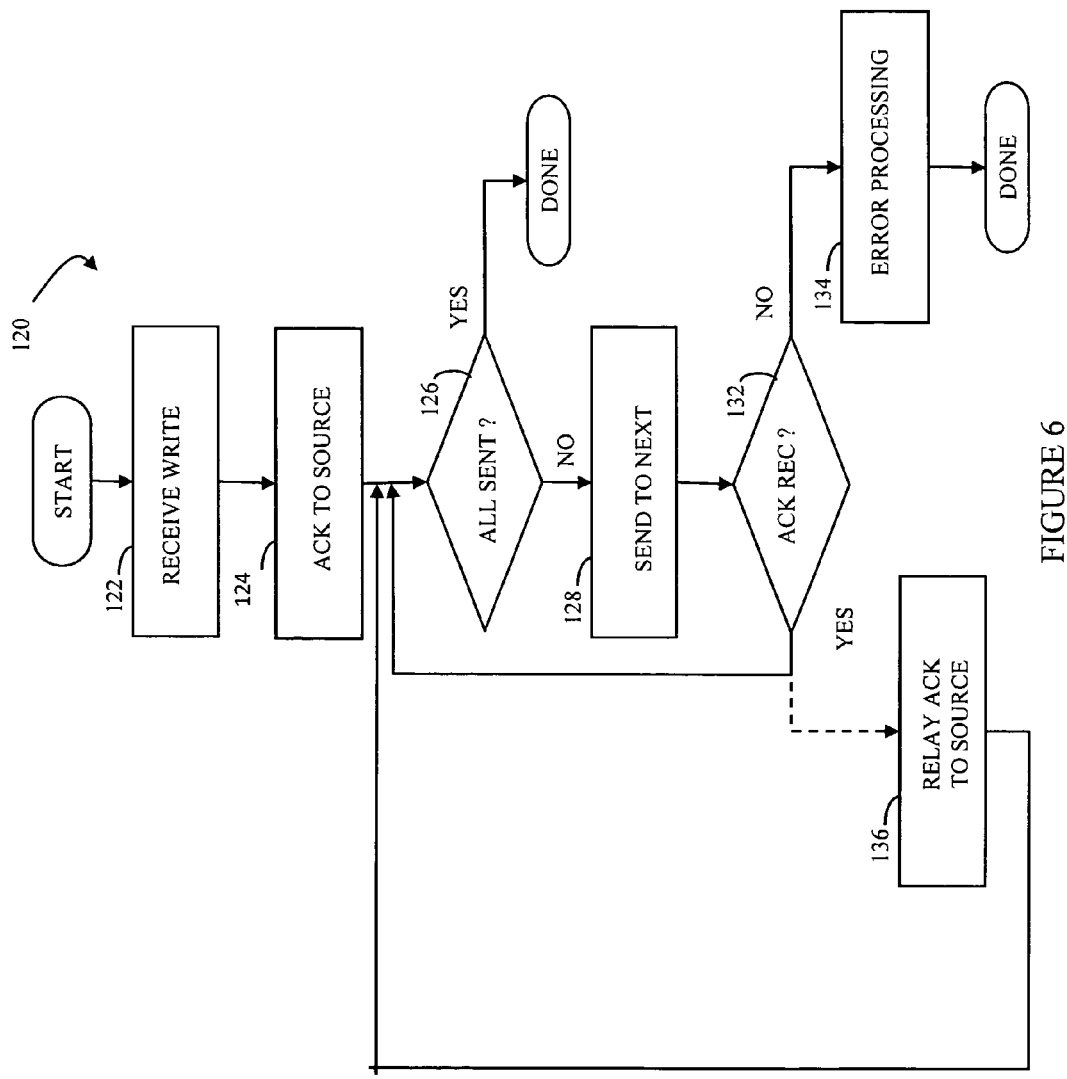
FIG. 6 is a flow chart illustrating an intermediate RDF site handling receiving and sending data in a cascaded RDF system according to an embodiment of the system described herein.

Referring to FIG. 6, a flow chart 120 illustrates processing performed in connection with an intermediate RDF site handling data transfers. Processing begins at a first step 122 where the write is received from the RDF source device, which is a logical storage device at another storage device that is either a local RDF site or an intermediate RDF site. Following the step 122 is a step 124 where receipt of the data at the step 122 is acknowledged back to the source of the data (i.e., the local RDF site or intermediate RDF site). In the case of a synchronous transfer, acknowledgement at the step 124 may be immediate. For other types of RDF transfers, processing at the step 124 may represent simply invoking whatever acknowledgement mechanism is used. For example, in instances where data is asynchronously transferred in chunks, acknowledgement at the step 124 may represent waiting to provide a single acknowledgement in response to receipt of an entire chunk. Thus, the acknowledgement may not be sent until after the all the chunks of data have sent to the downstream RDF sites.

Following the step 124 is a test step 126 where it is determined if the data received at the step 122 has been propagated to all downstream logical storage devices with which there is an RDF relationship (i.e., remote or other intermediate RDF sites). If so, then processing is complete. Otherwise, control transfers from the step 126 to a step 128, where the data is sent to a next one of the downstream logical storage devices using an appropriate RDF mechanism corresponding to the type of RDF relationship (e.g., synchronous, asynchronous, etc.) provided in connection with the downstream logical storage device.

Following the step 128 is a test step 132 where it is determined if the downstream logical storage device has appropriately acknowledged the RDF data provided thereto. If so, then control transfers from the test step 132 back to the step 126, discussed above, where it is determined if there are more downstream RDF devices to which the data needs to be propagated. Otherwise, if it is determined at the step 132 that an appropriate acknowledgement has not been received from the downstream logical storage device, then control transfers from the test step 132 to a step 134 where appropriate error processing is performed. The error processing performed at the step 134 may include providing appropriate notification that a link in an RDF relationship has failed. In other embodiments, the error processing performed at the step 134 may include retrying the data transmission a predetermined number of times before providing error notification. Following the step 134, processing is complete.

In some embodiments, one or more of the RDF sites may maintain a record of which data has been successfully propagated to different downstream RDF sites. For example, a local RDF site may maintain a record of which of the intermediate and remote RDF sites have acknowledged receipt of data that had been initially written to the local RDF site by one or more hosts coupled thereto. In an embodiment herein, the information may be maintained by an RDF site using the Symmetrix Differential Data Facility (SDDF) mechanism, which allows for a plurality sessions, each having a bitmap associated therewith bits that are set (e.g., to a logical one) whenever there is a write to a corresponding data location during a particular time period. If no write occurs to a particular location (no acknowledge received), the corresponding bit remains cleared (e.g., remains set to a logical zero). In an embodiment herein, each bit may correspond to a track of data. However, for other embodiments, it is possible to have each bit correspond to larger or smaller increments of data and it is also possible that different bits and/or different sets of bits correspond to different amounts of data. Note that it is possible to use any appropriate mechanism to track data changes, including a simulated SDDF mechanism.

In instances where one or more of the RDF sites track which other RDF sites successfully receive data, it may be useful to receive the acknowledgements from all of the downstream RDF cites. A mechanism for this is illustrated in the flow chart 120 by an alternative path from the test step 132 to a step 136, where the intermediate RDF site passes back any acknowledgement received from a downstream RDF site. Following the step 136, control transfers back to the test step 126, discussed above, for another iteration.

Figure 7:
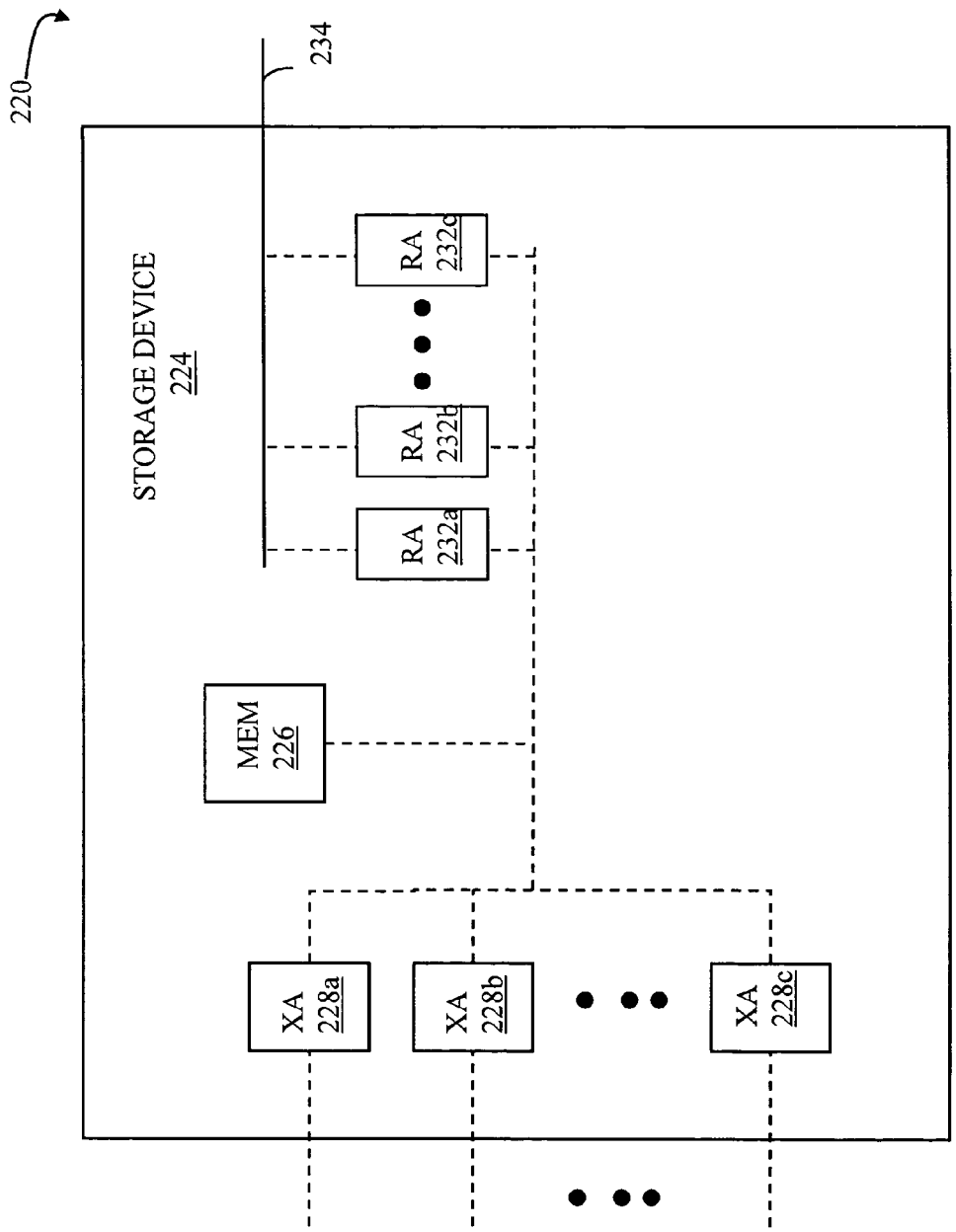
FIG. 7 is a diagram showing a diskless storage device according to an embodiment of the system described herein.

Referring to FIG. 7, a diagram 220 shows a diskless storage device 224 that is like the data storage device 24, discussed above, except that the diskless storage device 224 does not have any disk storage or similar non-volatile memory. The diskless storage device 224 includes an internal memory 226 that facilitates operation of the diskless storage device 224 as described elsewhere herein. The diskless storage device 226 also includes a plurality of adapters (XAs) 228a-228c that handle communication with the diskless storage device 224. The XA devices may represent RAs, HAs, or some other director device. The diskless storage device 224 may include one or more RAs 232a-232c. The RAs 232a-232c are coupled to an RDF link 234. The diskless storage device 224 may be coupled to additional RDF links (not shown) in addition to the RDF link 234. Links to any of the XAs 228a-228c that are RAs may be RDF links. In some embodiments, the diskless storage device 224 may use only RAs.

One or more internal logical data path(s) exist between the XAs 228a-228c, the RAs 232a-232c, and the memory 226. In some embodiments, one or more internal busses and/or communication modules may be used. In some embodiments, the memory 226 may be used to facilitate data transferred between the XAs 228a-228c and the RAs 232a-232c. The memory 226 may contain tasks that are to be performed by one or more of the XAs 228a-228c and the RAs 232a-232c, and a cache for storing data. Use of the memory 226 is described in more detail hereinafter.

Figure 8:
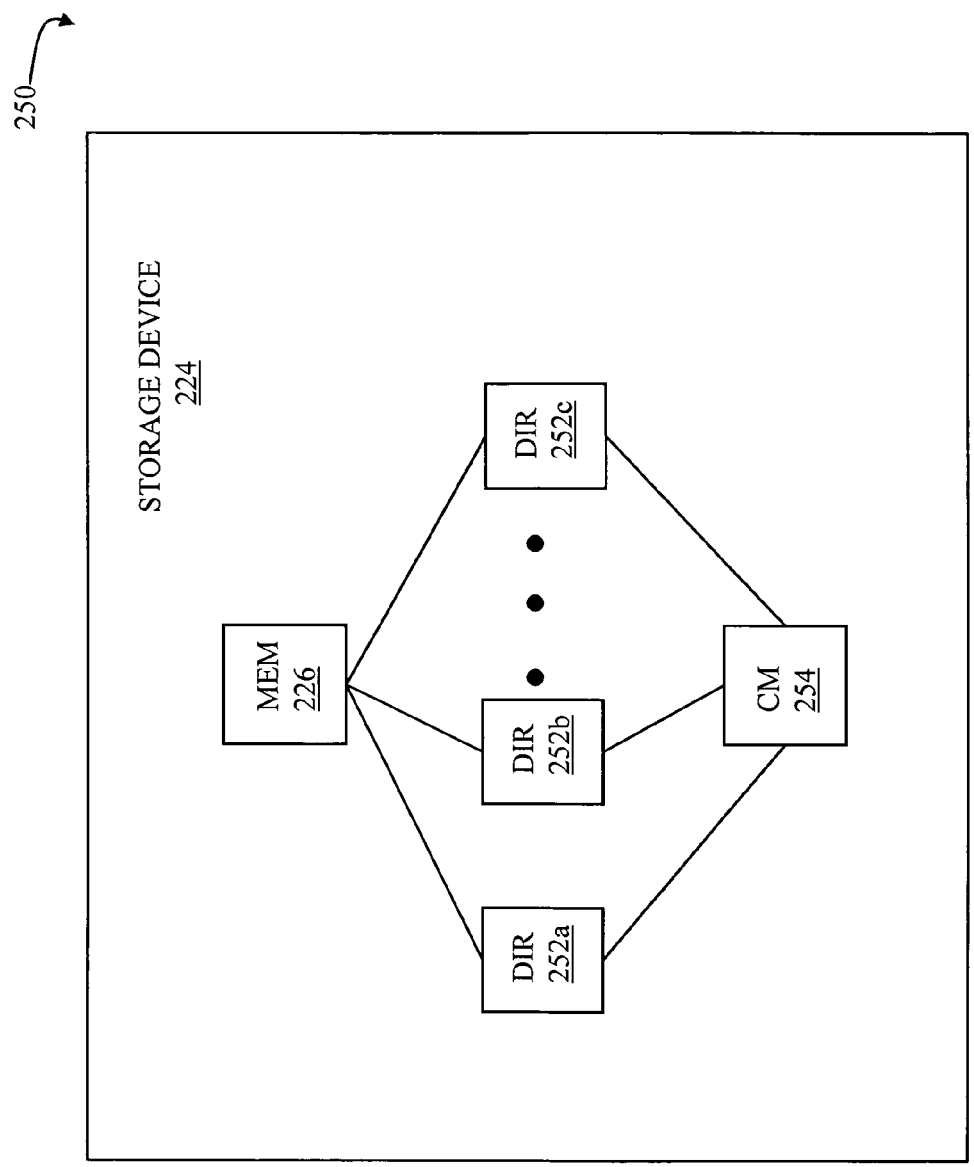
FIG. 8 is a diagram showing a storage device, memory, a plurality of directors, and a communication module that may be used in connection with the system described herein.

Referring to FIG. 8, a diagram 250 illustrates an embodiment of the diskless storage device 224 where each of a plurality of directors 252a-252c are coupled to the memory 226. Each of the directors 252a-252c represents one of the XAs 228a-228c or RAs 232a-232c. In an embodiment disclosed herein, there may be up to sixty four directors coupled to the memory 226. Of course, for other embodiments, there may be a higher or lower maximum number of directors that may be used.

The diagram 250 also shows an optional communication module (CM) 254 that provides an alternative communication path between the directors 252a-252c. Each of the directors 252a-252c may be coupled to the CM 254 so that any one of the directors 252a-252c may send a message and/or data to any other one of the directors 252a-252c without needing to go through the memory 226. The CM 254 may be implemented using conventional MUX/router technology where a sending one of the directors 252a-252c provides an appropriate address to cause a message and/or data to be received by an intended receiving one of the directors 252a-252c. Some or all of the functionality of the CM 254 may be implemented using one or more of the directors 252a-252c so that, for example, the directors 252a-252c may be interconnected directly with the interconnection functionality being provided on each of the directors 252a-252c. In addition, a sending one of the directors 252a-252c may be able to broadcast a message to all of the other directors 252a-252c at the same time.

In some embodiments, one or more of the directors 252a-252c may have multiple processor systems thereon and thus may be able to perform functions for multiple directors. In some embodiments, at least one of the directors 252a-252c having multiple processor systems thereon may simultaneously perform the functions of at least two different types of directors (e.g., an HA and an RA). Furthermore, in some embodiments, at least one of the directors 252a-252c having multiple processor systems thereon may simultaneously perform the functions of at least one type of director and perform other processing with the other processing system. In addition, all or at least part of the global memory 226 may be provided on one or more of the directors 252a-252c and shared with other ones of the directors 252a-252c.

Referring to FIG. 9, a data table 280 is shown as having a plurality of slots 282-284. In an embodiment herein, the data table 280 may be provided in the memory 226 of the diskless storage device 224 and/or in global memory distributed among one or more of the directors 252a-252c of the diskless storage device 224. In some embodiments, the diskless storage device 224 may have a single data table, but, in other embodiments, multiple data tables may be used.

Referring to FIG. 10, the slot 282 is shown in more detail as including a plurality of sectors 292-294. In an embodiment herein, the slot 282 may correspond to eight sectors, a sector may correspond to sixteen blocks and a block may correspond to 512 bytes of data. The size of each of the slots 282-284 may correspond to a size of a track on a disk, even though the diskless storage device 224 does not have any disks. Of course, other data sizes/increments may also be used and, in some cases, it may be possible to have variable slot/sector/block sizes.

Figure 11:
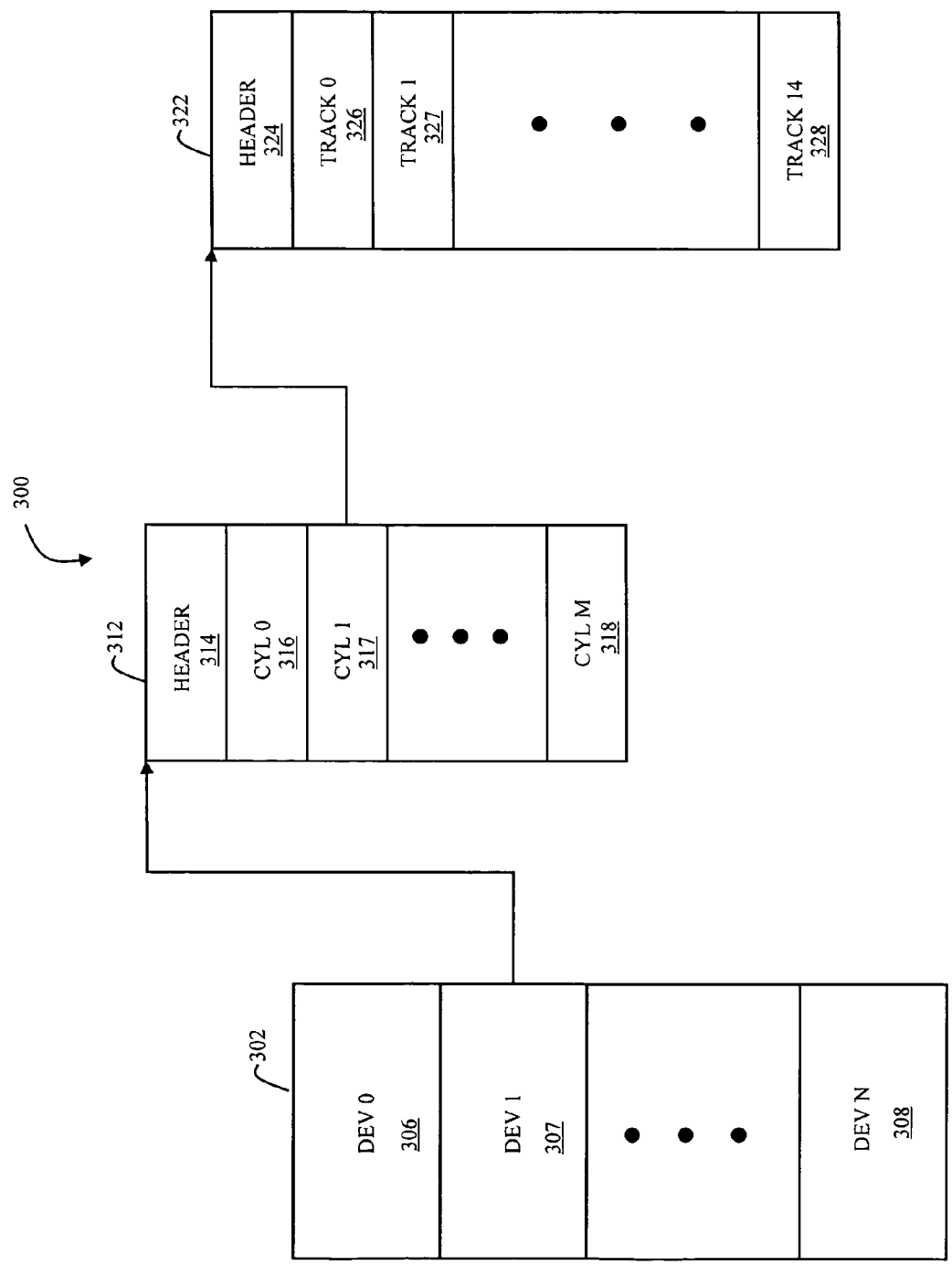
FIG. 11 is a diagram illustrating device tables and data structures used for a diskless storage device according to an embodiment of the system described herein.

Referring to FIG. 11, a diagram 300 illustrates tables that are used to keep track of device information for the diskless storage device 224. A first table 302 corresponds to all logical storage devices that are maintained by the diskless storage device 224 or by an element of the diskless storage device 224, such as an HA and/or an RA. In an embodiment herein, the diskless storage device 224 maintains the logical storage devices which may be presented to one or more external devices (e.g., other RDF sites) coupled to the diskless storage device 224. To the one or more external devices, the diskless storage device 224 may appear to operate identically to a conventional storage device. Thus, the directors 228a-228c of the diskless storage device may provide logical storage device functionality to an external device coupled thereto without using non-volatile memory (e.g., a disk), so that external devices address tracks, blocks, cylinders, etc. of the logical storage devices of the diskless storage device 224.

The table 302 includes a plurality of logical storage device entries 306-308 that correspond to all the logical storage devices used by the diskless storage device 224 (or portion of the diskless storage device 224). The entries in the table 302 may include descriptions for standard logical storage devices and/or other types of logical storage devices.

Each of the entries 306-308 of the table 302 correspond to another table that contains information for each of the logical storage devices. For example, the entry 307 may correspond to a table 312. The table 312 includes a header that contains overhead information. The table 312 also includes entries 316-318 for each of the cylinders of the logical storage device. In an embodiment disclosed herein, a logical storage device may contain any number of cylinders depending upon how the logical storage device is initialized. However, in other embodiments, a logical storage device may contain a fixed number of cylinders.

Each of the cylinder entries 316-318 corresponds to a track table. For example, the entry 317 may correspond to a track table 322 that includes a header 324 having overhead information. The track table 322 also includes entries 326-328 for each of the tracks, where each of the entries 326-328 points to one of the slots 282-284 and possibly includes additional overhead information (e.g., time created, time last modified, etc.). A null pointer in one of the entries 326-328 indicates that there is no corresponding one of the slots 282-284 containing data. In an embodiment disclosed herein, there are fifteen tracks for every cylinder. However, for other embodiments, it may be possible to have different numbers of tracks for each of the cylinders or even a variable number of tracks for each cylinder.

The tables 302, 312, 322 may be stored in the global memory 226 of the diskless storage device 224 (in a location different from the slots 282-284). In addition, the tables 302, 312, 322 corresponding to devices accessed by a particular one of the directors 252a-252c may be stored all or at least partially in memory thereof, that is possibly accessible by other ones of the directors 252a-252c.

Note that, in some instances, access to data may be controlled by a flag or lock that prohibits multiple processes having access to the data simultaneously. This is especially useful in instances where a device table is being read or modified. The system disclosed herein contemplates any one of a variety of mechanisms for controlling access to data by multiple processes, including conventional combinations of software and/or hardware locks, also known as "flags" or "semaphores". In some instances, a process accessing data may need to wait until another process releases the data. In one embodiment, a hardware lock controls access to a software lock (flag) so that a process first obtains control of the hardware lock, tests the software lock, and then, if the software lock is clear, the process sets the software lock and then releases the hardware lock. If the process gets the hardware lock and determines that the software lock is not clear, then the process releases the hardware lock so that another process that has set the software lock can clear the software lock at a later time.

In an embodiment herein, the diskless storage device 224 may keep track of the ones of the slots 282-284 that are available for receiving data (i.e., through one or more of the XAs 228a-228c) using any appropriate mechanism, such as maintaining a linked list of free ones of the slots 282-284. In some embodiments, once all of the slots have been used, new data is stored by overwriting an oldest (least recently used) one of the slots 282-284. In other embodiments, the diskless storage device may receive an indication that particular ones of the slots 282-284 no longer need to be maintained and may therefore be designated as free slots available for storing new data.

Diskless storage devices may be used for any number of appropriate purposes, including intermediate RDF sites. In an embodiment herein, data may be received by a diskless storage device used as an intermediate RDF site and stored in one of the slots until the data has been successfully propagated to one or more downstream RDF sites (possibly additional diskless storage devices). After the downstream RDF site(s) have acknowledged safe receipt of the data, the corresponding slot(s) in the diskless storage device may be returned to a list of free slots available for accepting new data. In an embodiment herein, data stored by a diskless storage device in connection with being used as an intermediate RDF site may not be accessed by any hosts coupled to the intermediate RDF site but, instead, may only be propagated to downstream RDF sites.

Figure 12:
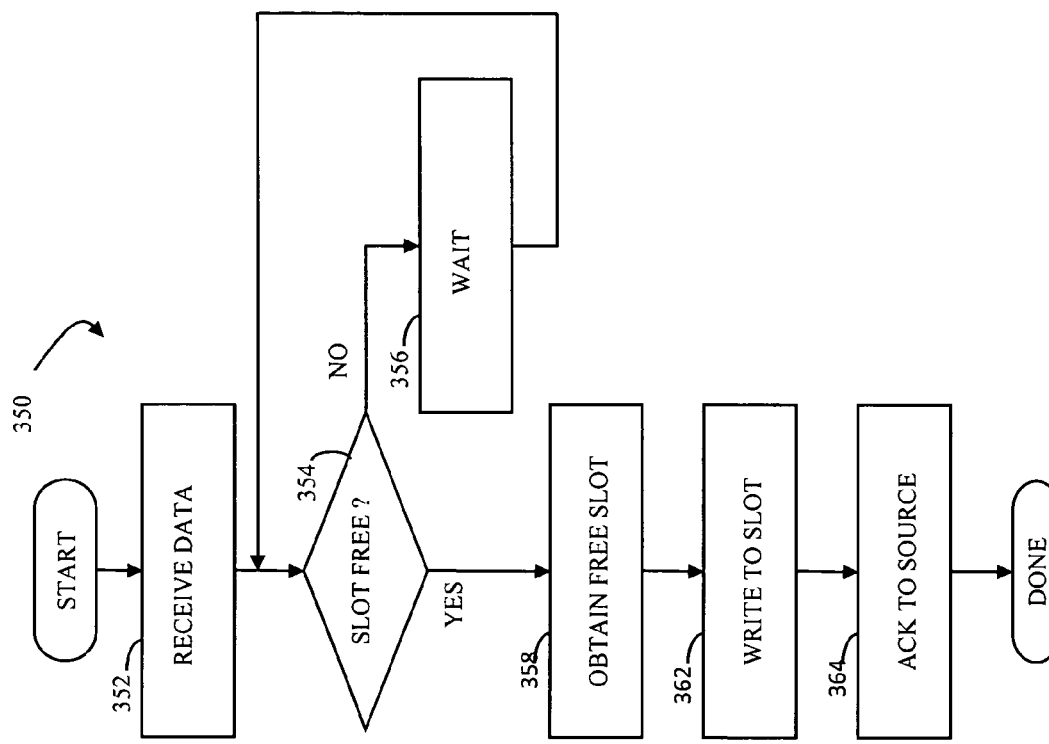
FIG. 12 is a flow chart illustrating steps performed by a diskless storage device acting as an intermediate RDF site and receiving data according to an embodiment of the system described herein.

Referring to FIG. 12, a flow chart 350 illustrates a process for a diskless storage device to receive data in connection with operating as an intermediate RDF site. Processing begins at a first step 352 where RDF data is received by the diskless storage device 224 (e.g., through one of the XAs 228a-228c). Following the step 352 is a test step 354 where it is determined if the diskless storage device has a free slot in which to store the data received at the step 352. If not, then control transfers from the test step 354 to a step 356 where the system waits for a predetermined amount of time (e.g., one second) for a slot to become free. As discussed in more detail elsewhere herein, slots of the diskless storage device 224 are freed when the slots are no longer needed. The diskless storage device 224 may use any appropriate mechanism to indicate which slots are free, including maintaining a linked list of free slots.

Following the step 356, control transfers back to the step 354 to test again if there are any free slots. Note that, in some embodiments, a counter/time may be used to monitor the total number of times and/or amount of time the system needs to wait for a free slot. In some cases, alternative processing (error processing) may be performed if the wait is too long.

If it is determined at the test step 354 that a free slot is available, then control transfers from the test step 354 to a step 358 where the free slot is obtained for use (i.e., locked to prevent use by any other process). Following the step 358, control transfers to a step 362 where the data is written to the slot obtained at the step 358. Following the step 362, control transfers to a step 364 where receipt of the data is acknowledged to the source of the data (e.g., the RDF site that provided the data to the diskless storage device). In some cases, depending on the RDF modes that are used, the diskless storage device 224 may wait to send an acknowledge back to the source until the diskless storage device 224 has successfully transferred data to downstream RDF devices. Following the step 364, processing is complete.

There may be a separate process that examines slots of the diskless storage device and transfers data to downstream RDF sites (other intermediate RDF site(s) and/or remote RDF site (s)). Once the data has been transmitted to, and acknowledged by, all downstream RDF sites, the corresponding slot of the diskless storage device may be freed for future use.

Figure 13:
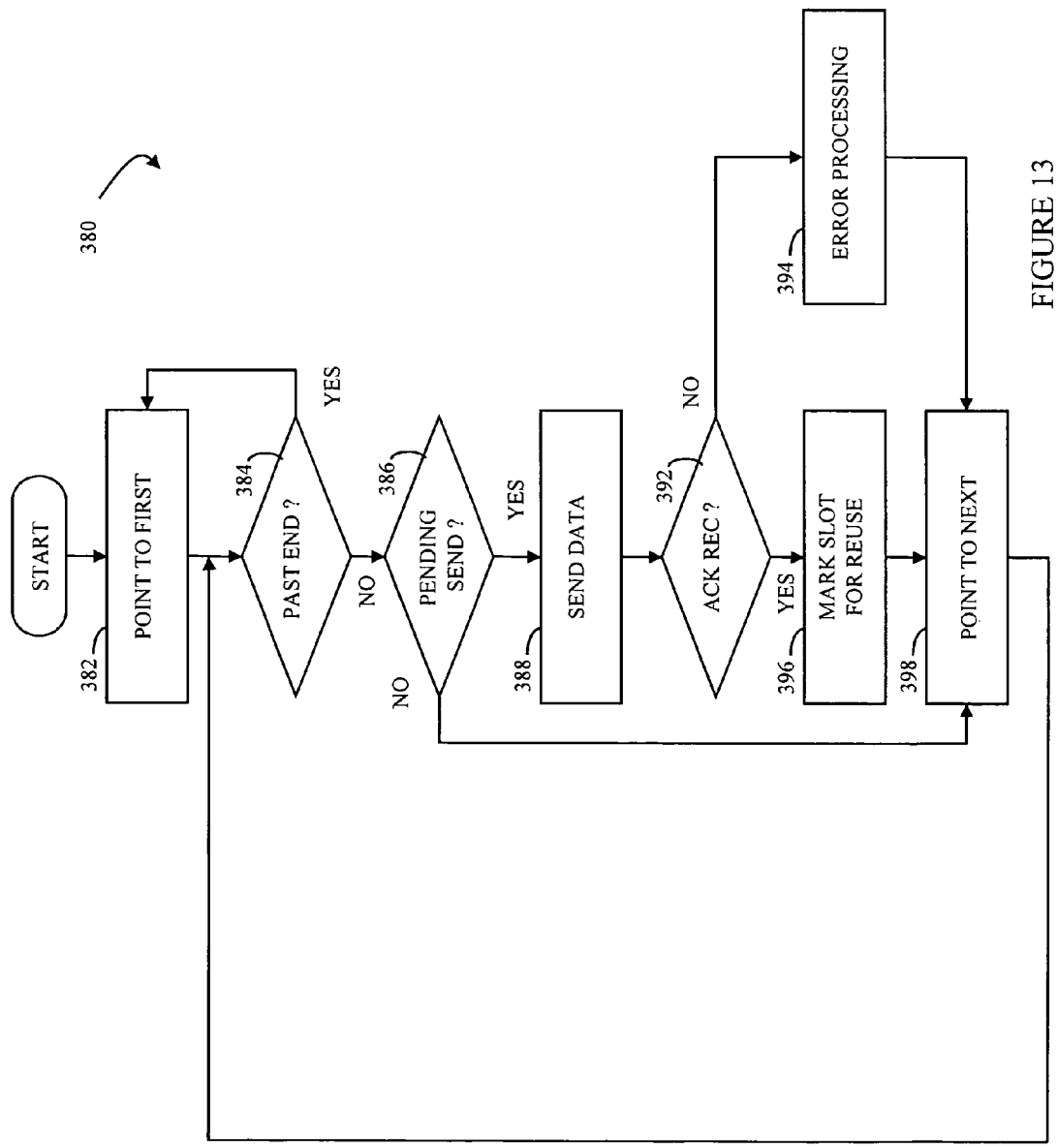
FIG. 13 is a flow chart illustrating steps performed by a diskless storage device acting as an intermediate RDF site and transferring data to downstream RDF site(s) according to an embodiment of the system described herein.

Referring to FIG. 13, a flow chart 380 illustrates processing performed by the diskless storage device 224 to transfer data to one or more downstream RDF sites. Processing begins at a first step 382, where a pointer that iterates through the slots of the diskless storage device is made to point to a first slot. Following the step 382 is a test step 384 where it is determined if the pointer points past the end of the slots (e.g., equals a value that is greater than the highest memory address of the slots). If so, then control transfers from the test step 384 back to the step 382 to reset the pointer. Otherwise, control transfers from the step 384 to a test step 386 where it is determined if the slot pointed to by the pointer has data that needs to be sent to one or more downstream RDF sites.

If it is determined at the test step 386 that the slot pointed to by the pointer contains data that needs to be sent to one or more downstream RDF sites, then control transfers from the test step 386 to a step 388 where the data is sent to the one or more downstream RDF sites using, for example, conventional RDF data transfer mechanisms. Following the step 388 is a test step 392 where it is determined if an appropriate acknowledge signal has been received from the one or more downstream RDF sites. If not, then control transfers from the test step 392 to a step 394 where appropriate error processing is performed (e.g., reporting an error to a user, to a source RDF site, etc.).

If it is determined at the test step 392 that an appropriate acknowledge message has been received from all of the downstream RDF sites, then control passes from the test step 392 to a step 396 where the slot is marked for reuse (returned to a list of free slots for the diskless storage device 224). Following the step 396 is a step 398 where the pointer that iterates through the slots of the diskless storage device 224 is incremented to point to the next slot. Note that the step 398 is also reached following the step 394 and is also reached directly from the test step 386 if the slot pointed to by the pointer does not contain any data that needs to be sent to a downstream RDF site. Following the step 398, control transfers back to the step 384 for another iteration.

Note that, instead of the diskless storage device 224, it is possible to use a thin storage device, where only some of the address space is mapped to physical data. In addition, it is possible to use a storage device having disk space (non-volatile storage), where only the logical storage devices used as intermediate RDF devices are diskless. That is, a conventional storage device may be used, where diskless logical storage devices within the conventional storage device operate as intermediate RDF devices as described herein.

Figure 14:
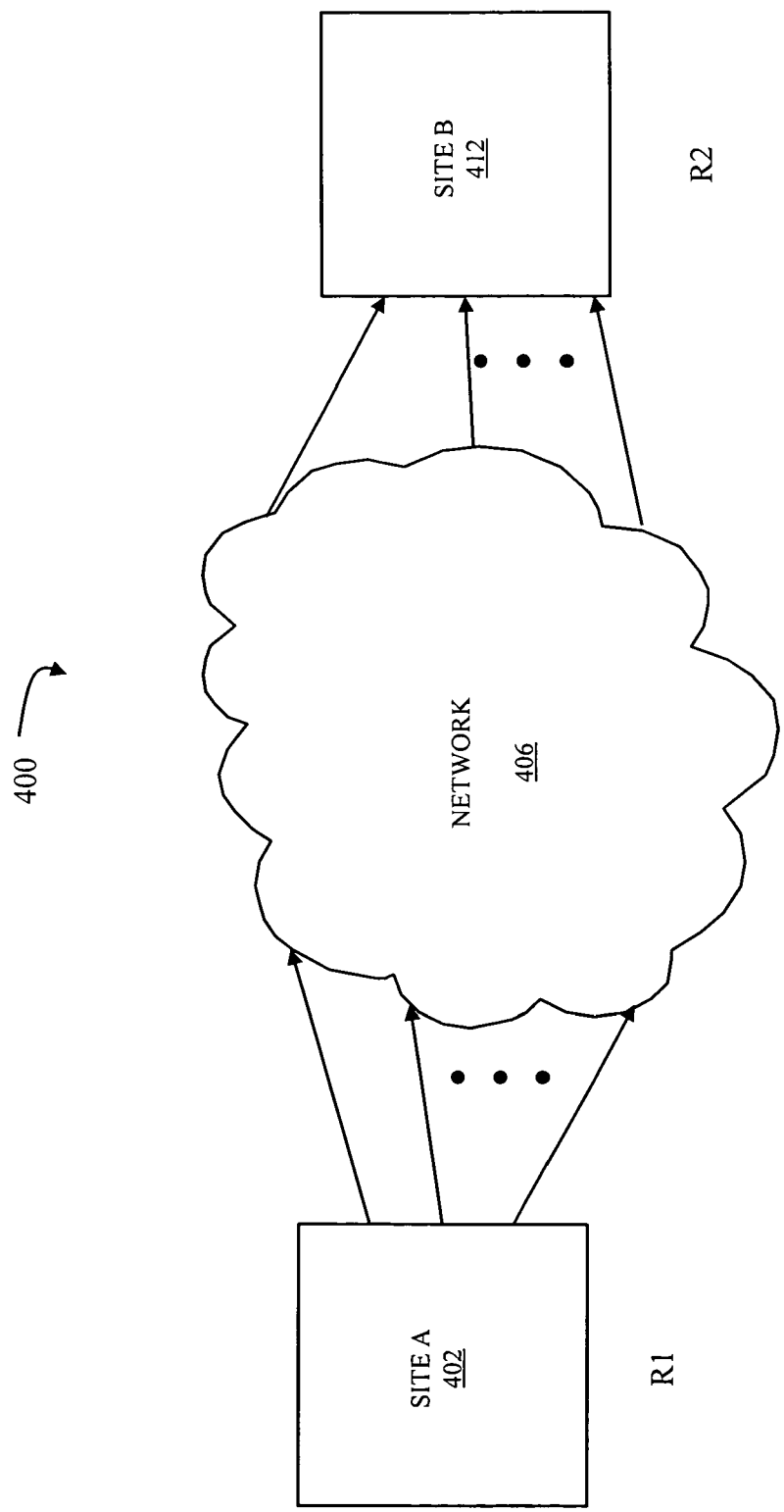
FIG. 14 is a diagram illustrating an R1 device and an R2 device that communicate through a network using a plurality of ports according to an embodiment of the system described herein.

Referring to FIG. 14, a diagram 400 illustrates an R1 device 402 (Site A) sending data to an R2 device 404 (Site B) through a network 406 using a plurality of connections. As discussed elsewhere herein, it is possible for a storage device to have multiple RAs (multiple ports) for communicating with other storage devices. Thus, in the diagram 400 of FIG. 14, the R1 device 402 sends data to the R2 device 404 through the network 406 using multiple ports of the R1 device 402 and the R2 device 404 receives the data from the R1 device 402 through the network 406 using multiple ports of the R2 device 404.

It is possible for the R1 device 402 to send a first data packet that is not received by the R2 device 404. For example, the R1 device 402 may send data and then time out waiting for an acknowledgement from the R2 device 404. In such a case, the R1 device 402 may abort and then resend the data. If the second or subsequent attempt to send the data is successful, then the R1 device 402 may continue sending new data. However, since the network 406 is used for transmitting data from the R1 device 402 to the R2 device 404, then it is possible for a previously aborted data packet to arrive at the R2 device 404 after subsequent data has been sent and received. For example, the R1 device 402 may send Packet 1 and not receive an acknowledgement (timeout). The R1 device 402 may then successfully resend Packet 1 and then, following that, may then send a subsequent Packet 2. The R2 device 404 may receive (and acknowledge) the resent Packet 1 and then receive (and acknowledge) Packet 2. However, it is possible for the R2 device 404 to then receive from the network 406 the initial (and previously unacknowledged) version of Packet 1. The system described herein is designed to prevent the R2 device 404 from incorrectly overwriting the previously-received data from Packet 2 with the out-of-sequence data received for Packet 1.

Figure 15:
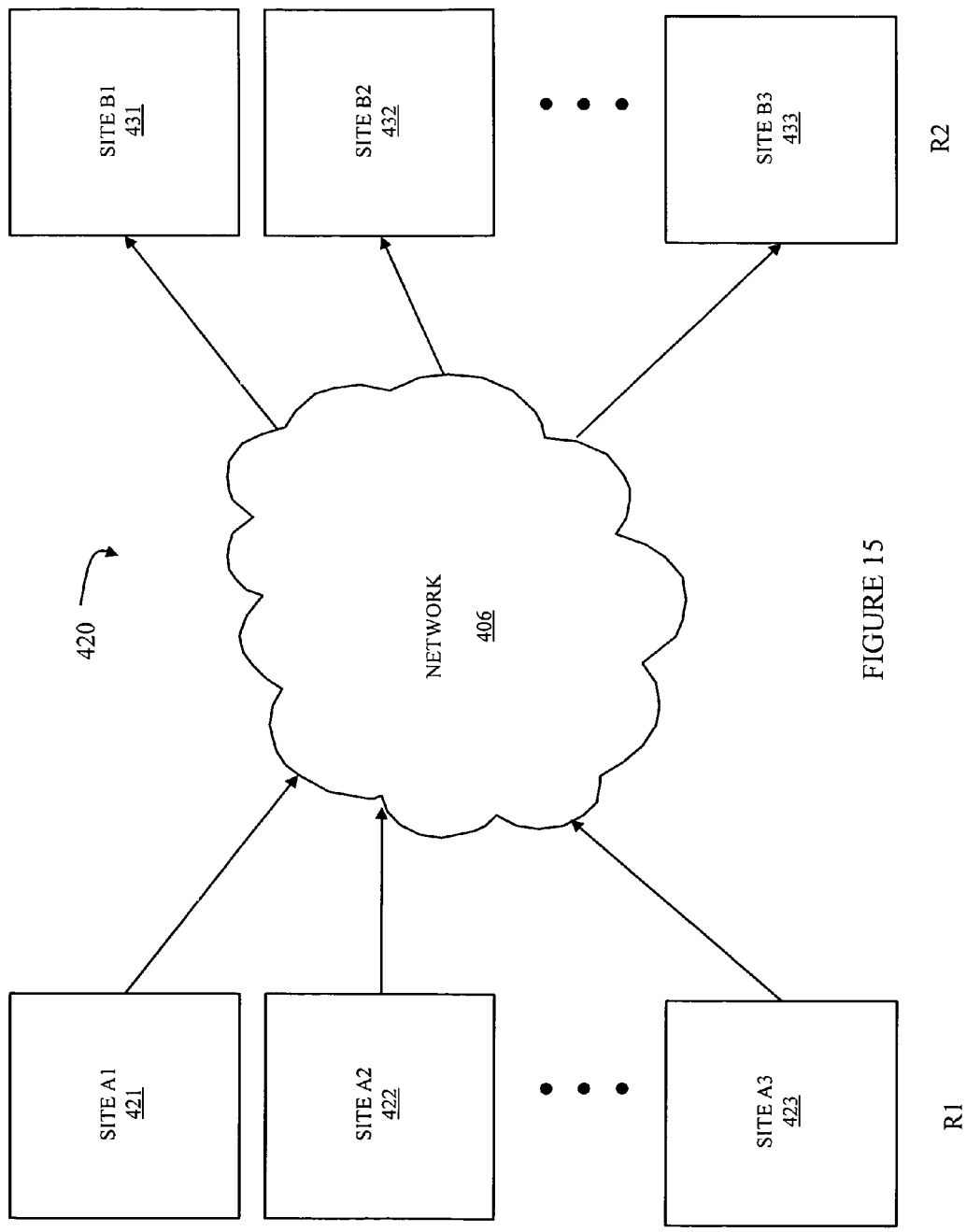
FIG. 15 is a diagram illustrating a plurality of R1 devices and a plurality of R2 devices that communicate through a network using a plurality of ports according to an embodiment of the system described herein.

Referring to FIG. 15, a diagram 420 shows a plurality of R1 devices 421-423 that send data to a plurality of R2 devices 431-433 through the network 406. Just as the system described herein is applicable to storage devices having a plurality of ports (as described above), the system may also be applied to a plurality of storage devices providing group R1 functionality and/or a plurality of storage devices providing group R2 functionality. In addition, one or more of the storage devices 421-423, 431-433 may have multiple ports like the storage devices 402, 404 of FIG. 14.

Figure 16B:
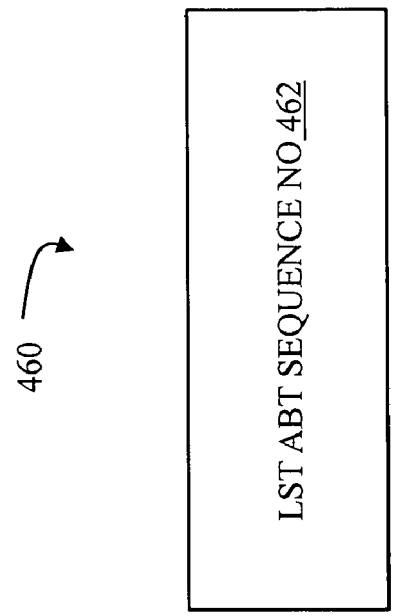
FIGS. 16A and 16B are diagrams illustrating data elements used in connection with transferring data according to an embodiment of the system described herein.
Figure 16A:
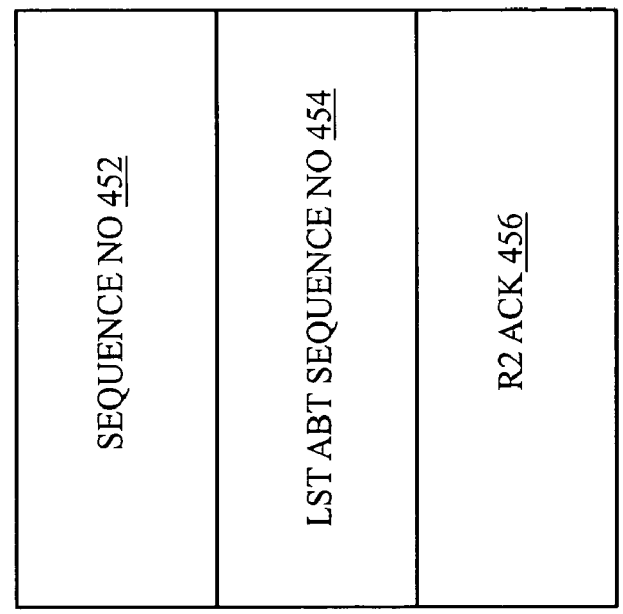

Referring to FIG. 16A, a data element 450 is used by one or more of the R1 devices to provide the functionality described herein. The data element 450 is accessible by all of the R1 devices. In the case of a single R1 device with multiple ports (multiple RAs), the data element 450 may be provided in globally-accessible memory of the R1 device (e.g., the memory 26 of the storage device 24 of FIG. 1). In the case of multiple R1 devices, the data element 450 may be stored in a location that may be accessed by each of the R1 devices, such as a global memory location of a first one of the R1 devices, where the data element 450 is accessed by other R1 devices using system calls (or similar) to the first one of the R1 devices.

The data element 450 includes a sequence no. field 452, a last aborted sequence no. field 454, and an R2 ack field 456. The sequence no. field 452 represents a sequence number assigned to every data transmission (each packet) from the R1 device(s) to the R2 device(s). The last aborted sequence no. field 454 represents the last sequence number for which an abort occurred in connection with transmission of data from the R1 device(s) to the R2 device(s). The R2 ack field indicates whether the R2 device(s) have acknowledges receipt of information indicating the value of the last aborted sequence no. field 454. In an embodiment herein, the sequence no. field 452 and the last aborted sequence no. field 454 are both five bytes and the R2 ack field 456 is a single byte (Boolean), although any appropriate sizes may be used. The sequence no. field 452, the last aborted sequence no. field 454, and the R2 ack field 456 are described in more detail elsewhere herein.

Referring to FIG. 16B, a data element 460 is used by one or more of the R2 devices to provide the functionality described herein. Just as with the data element 450, the data element 460 is accessible by all of the R2 devices. In the case of a single R2 device with multiple ports (multiple RAs), the data element 460 may be provided in globally-accessible memory of the R2 device while, in the case of multiple R2 devices, the data element 460 may be stored in a location that may be accessed by each of the R2 devices (e.g., via a system call to one of the R2 devices). The data element 460 includes a last aborted sequence no. field 462, which indicates the last sequence number for which a data transmission was aborted by the R1 device(s). In an embodiment herein, the last aborted sequence no. field 462 is five bytes, although any appropriate size may be used. The last aborted sequence no. field 462 is described in more detail elsewhere herein.

Figure 17:
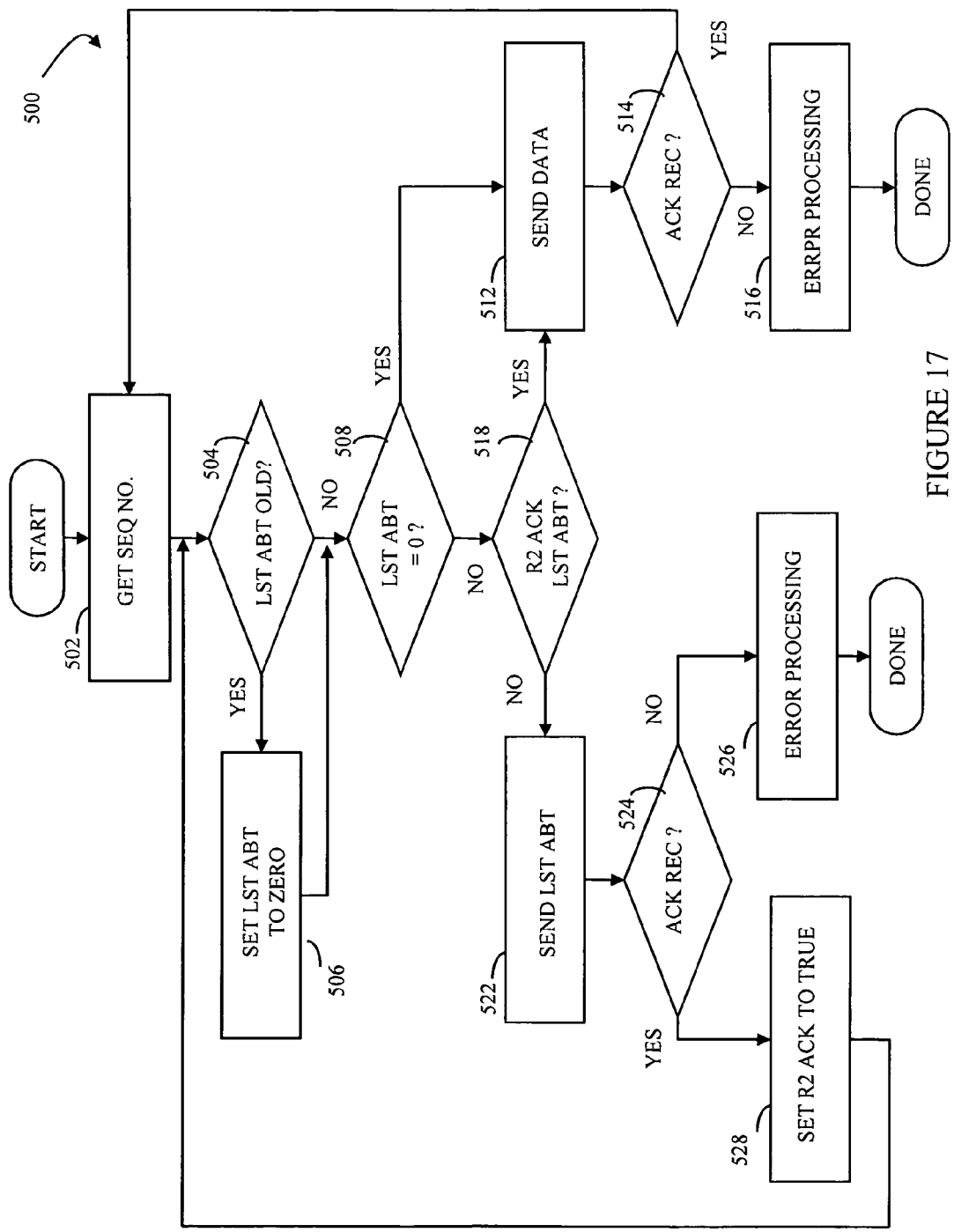
FIG. 17 is a flow chart illustrating steps performed by one or more R1 devices in connection with sending data to one or more R2 devices according to an embodiment of the system described herein.

Referring to FIG. 17, a flow chart 500 illustrates steps performed by one or more R1 devices in connection with sending data according to the system described herein. Processing begins at a first step 502 where the sequence number (from the sequence no. field 452) is obtained. In an embodiment herein, each data transmission by an R1 device is associated with a sequence number that is incremented each time the sequence number is used. Thus, data associated with sequence number X temporally precedes data associated with sequence number X+1, which temporally precedes data associated with sequence number X+2, etc. In addition, in some instances, it is useful to have only one process/device at a time access and/or increment the sequence number (i.e., for a process/device to lock access). Accordingly, obtaining the sequence number at the step 502 may represent locking the sequence no. field 452, reading the value thereof, incrementing the value, and then unlocking the sequence no. field 452. Locking may also be used in connection with accessing/modifying other data, as appropriate.

In an embodiment herein, the values in the sequence no. field 452, the last aborted sequence no. field 454, and the last aborted sequence no. field 462 all wrap so that, for example, if the sequence number field 452 is five bytes and equals 0xFFFFFFFFFF, then incrementing the value will result in a value of zero. In some embodiments, a value of zero may be used to represent a special value that is processed differently. In such a case, incrementing 0xFFFFFFFFFF may result in a value of one or another non-zero value. Note that incremental amounts other than one may be used.

Following the step 502 is a test step 504 where it is determined if value indicated by the last aborted sequence no. field 454 is relatively old. The processing at the step 504 compares the current sequence number with the last aborted sequence number in a manner that accounts for either or both of the values possibly wrapping (explained in more detail elsewhere herein). Assuming that a certain number of I/O operations occur at a particular rate, the difference determined at the step 504 represents an amount of time between a last aborted I/O operation and a current I/O operation. If the network 406 has an expected maximum latency, then a value for the last aborted sequence number field 454 that represents a time greater than the maximum latency may be considered as being relatively old at the step 504. In an embodiment herein, a difference that represents a number of I/O operations that may be expected in four hours is used to determine if the value of the last aborted sequence no. field 454 is relatively old.

If it is determined at the test step 504 that the value represented by the last aborted sequence no. field 454 is relatively old, then control transfers from the test step 504 to a step 506 where the value of the last aborted sequence no. field 454 is set to zero. In an embodiment herein, setting value of the last aborted sequence no. field 454 to zero indicates that the last aborted sequence number occurred long enough ago so as not to be of consequence (and thus no longer taken into consideration). For example, if the maximum latency of the network 406 is one minute, and if comparing the value of the last aborted sequence no. field with the value of the sequence no. field 452 indicates that the last aborted I/O occurred over four hours ago, then the last aborted sequence no. field 454 is of no consequence and may be zeroed out at the step 506.

Following the step 506 or following the step 504 if the value of the last aborted sequence no. field 456 is not relatively old is a test step 508 where it is determined if the last aborted sequence no. field 454 has a value of zero. If so, then control transfers from the step 508 to a step 512 where the data is sent from the R1 device(s) to the R2 device(s). Following the step 512 is a test step 514 where it is determined if the R2 device(s) have acknowledged receipt of the data. If so, then control transfers from the step 514 back to the step 502, discussed above, for another iteration of sending data. Otherwise, if it is determined at the test step 514 that the R2 device(s) have not acknowledged the data, then control transfers from the test step 514 to a step 516 where no acknowledging processing is performed. The no acknowledge processing performed at the step 516 is discussed in more detail elsewhere herein. Following the step 516, processing is complete.

If it is determined at the step 508 that the value of the last aborted sequence number field 454 is not zero, then control transfers from the step 508 to a step 518 where it is determined if the value of the R2 ack field 456 is true, indicating that the R2 device(s) have acknowledged receipt of the most recent value of the last aborted sequence no. field 454. If so, then control transfers from the step 518 to the step 512, discussed above, to send the data. Otherwise, control transfers from the test step 518 to a step 522 where the value of the last aborted sequence no. field 454 is transferred from the R1 device(s) to the R2 device(s). In some embodiments, additional data and the sequence number (obtained at the step 502) are transmitted at the step 522 along with the value of the last aborted sequence no. field 454. In other embodiments, the value of the last aborted sequence no. field 454 is transmitted at the step 522 without additional data.

Following the step 522 is a test step 524 where it is determined if the R2 device(s) acknowledged receipt of the value of the last aborted sequence no. field 454. If not, then control transfers from the step 524 to a step 526 where error processing is performed. The particular error processing performed at the step 526 may be implementation dependent, but may include reporting the error to a user/calling process. Following the step 526, processing is complete. If it is determined at the step 524 that the R2 device(s) acknowledged receipt of the value of the last aborted sequence no. field 454, then control transfers from the test step 524 to a step 526 where the value of the R2 ack field 456 is set to true. Following the step 526, control transfers back to the step 504 for another iteration. Note that, in embodiments where data and the sequence number is sent at the step 522, then control may transfer from the step 526 back to the step 502.

Figure 18:
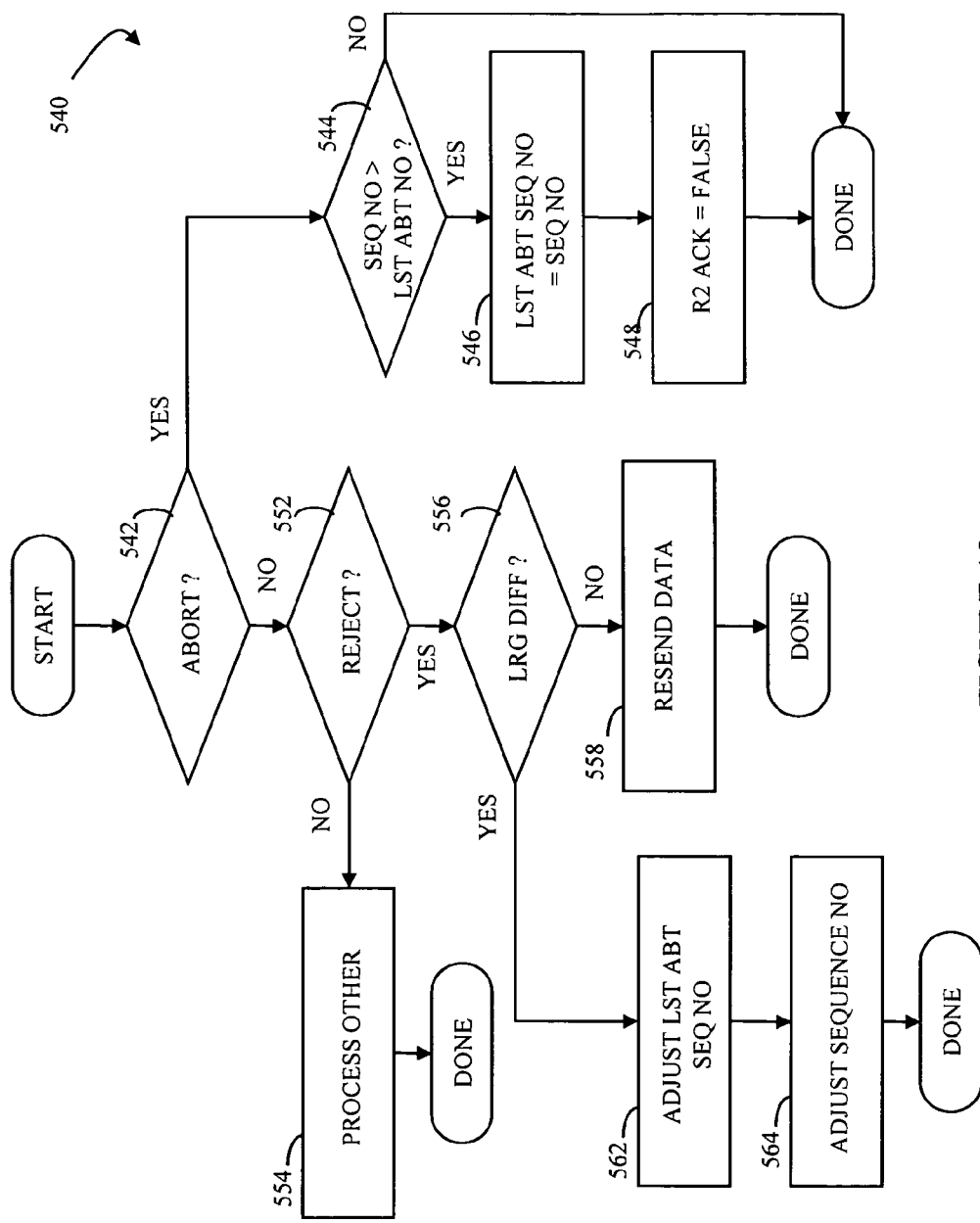
FIG. 18 is a flow chart illustrating steps performed by one or more R1 devices in connection with data not being acknowledged by one or more R2 devices according to an embodiment of the system described herein.

Referring to FIG. 18, a flow chart 540 illustrates in more detail no acknowledge processing performed at the step 516 of the flow chart 500 of FIG. 17. Processing begins at a first step 542 where it is determined if the no acknowledging caused the I/O to abort (e.g., a timeout on waiting to receive an acknowledgement). If so, then control transfers from the step 542 to a test step 544 where it is determined if the sequence number associated with the aborted I/O is greater than (later in time) the value indicated by the last aborted sequence no. field 454. If so, then control transfers from the step 544 to a step 546 where the value of the last aborted sequence no. field 454 is set equal to the sequence number of the aborted I/O. Following the step 546 is a step 548 where the value of R2 ack is set to FALSE. Following the step 548, processing is complete. Note that, if it is determined at the step 544 that the sequence number associated with the aborted data is not greater than the value indicated by the last aborted sequence no. field 454, then the steps 546, 548 are not performed and processing is complete.

If it is determined at the step 542 that the lack of acknowledgement is not due to an abort, then control transfers from the step 542 to a test step 552 where it is determined if the R2 device(s) have rejected the data. As discussed in more detail elsewhere herein, the R2 device(s) may reject the data if the sequence number associated therewith is less than the value indicated by the last aborted sequence no. field 462 at the R2 device(s). If it is determined at the step 552 that the transmission error is not due to the data being rejected by the R2 device(s), then control transfers from the step 552 to a step 554 where other error processing is performed. The other error processing performed at the step 554 may include any appropriate error processing, such as reporting an error to the user and/or to the calling process. Following the step 554, processing is complete.

If it is determined at the test step 552 that the data had been rejected by the R2 device(s), then control transfers from the test step 552 to a test step 556 where it is determined if the difference between the sequence number associated with the rejected data and the value of the last aborted sequence no. field 462 at the R2 device(s) is relatively large. In an embodiment herein, the R2 device(s) return the value of the last aborted sequence no. field 462 when data is rejected by the R2 device(s). Under some conditions (e.g., error at the R2 device (s)), it is possible for the difference between the sequence number associated with the rejected data and the value of the last aborted sequence no. field 462 to be larger than expected, causing a significant number of data transmissions to be inappropriately rejected by the R2 device(s). The parameters used to determine whether the difference is exceptionally large may be similar to that used for determining when to set the last aborted sequence no. fields 454, 462 to zero (e.g., I/O rate, latency of the network 406, etc.). Note also that the test at the step 556 may be performed by comparing the value of the last aborted sequence no. field 462 at the R2 device(s) with the last aborted sequence no. field 454 at the R1 device(s) such that the value of the last aborted sequence no. field 462 may be deemed relatively large at the step 556 if the value from the R2 device(s) exceeds that at the R1 device(s), taking into account that the data wraps and that one or both of the values may have been zeroed according to other processing described herein.

If it is determined at the test step 556 that the difference between the sequence number associated with the rejected data and the value of the last aborted sequence no. field 462 at the R2 device(s) is not relatively large, then control passes from the step 556 to a step 558 where the data is resent (using, for example, the processing illustrated by the flow chart 500 of FIG. 17). Following the step 558, processing is complete.

If it is determined at the test step 556 that the difference between the sequence number associated with the rejected data and the value of the last aborted sequence no. field 462 at the R2 device(s) is relatively large, then control passes from the step 556 to a step 562 where the value of the last aborted sequence no. field 454 at the R1 device(s) is set equal to the value of the value of the last aborted sequence no. field 462 at the R2 device(s). Following the step 562 is a step 564 where the value of the sequence no. field 452 is set to one more than the value of the last aborted sequence no. field 462 at the R2 device(s). Following the step 564, processing is complete.

Figure 19:
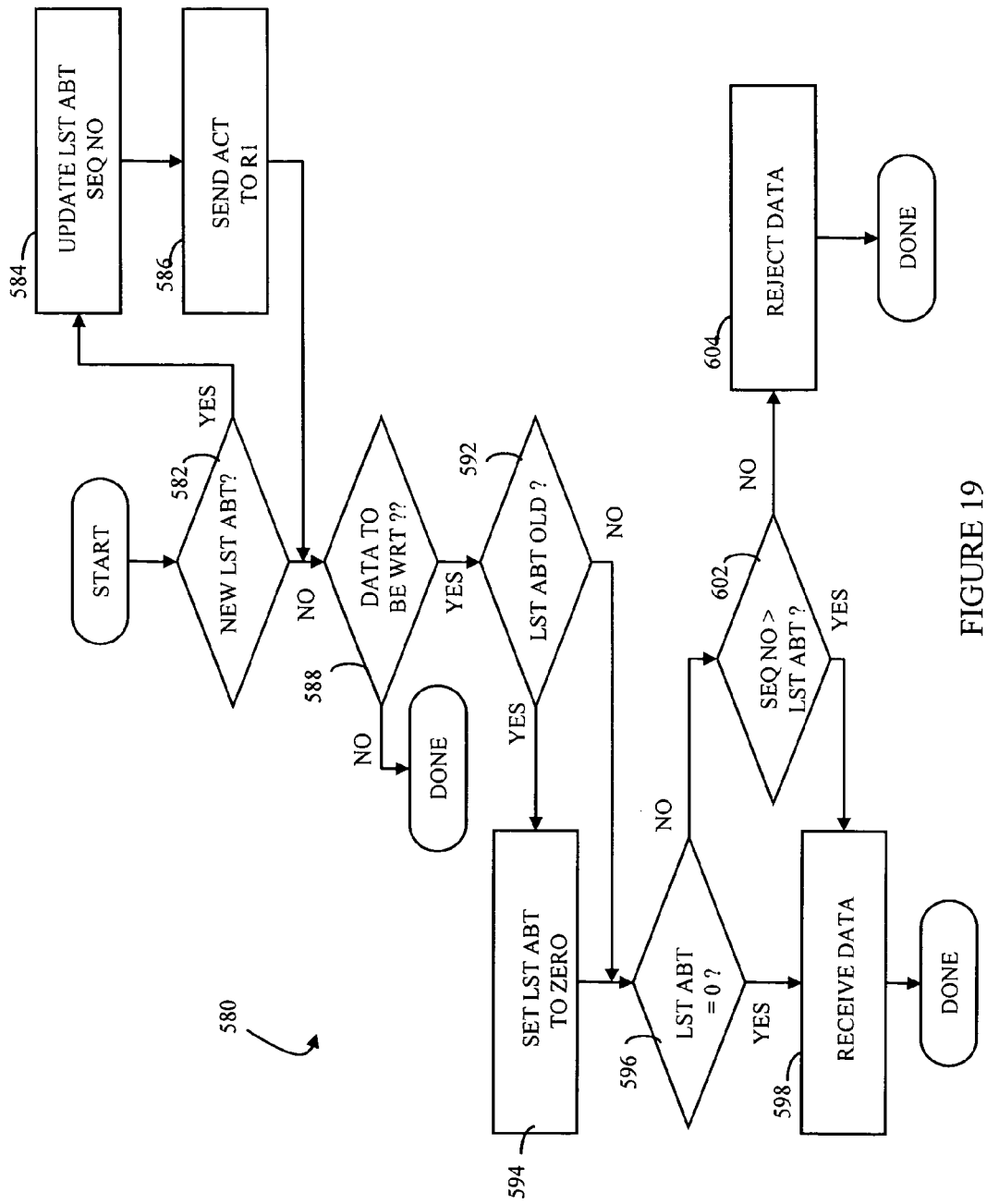
FIG. 19 is a flow chart illustrating steps performed by one or more R2 devices in connection with receiving data from one or more R1 devices according to an embodiment of the system described herein.

Referring to FIG. 19, a flow chart 580 illustrates steps performed by one or more R2 devices in connection with receiving data from the R1 device(s). Processing begins at a first step 582 where it is determined if the data represents a message from the R1 device(s) indicating a new value for the last aborted sequence no. field 454 (i.e., a value sent at the step 522 of the flow chart 500 of FIG. 17). If so, then control passes from the step 582 to a step 584 where the value of the last aborted sequence no. field 462 at the R2 device(s) is set equal to the received value. Following the step 584 is a step 586 where the R2 device(s) send an acknowledgement back to the R1 device(s) that the new value has been received. In an embodiment herein, the acknowledgement may include the value of the last aborted sequence no. field 462.

Following the step 586, or following the step 582 if the received data does not include a new value for the last aborted sequence number, is a test step 588 where it is determined if the received data includes data to be written to the storage device(s). In some embodiments, data containing a new value for the last aborted sequence number is sent without any other data while in other embodiments, data indicative of the last aborted sequence no may be sent along with data to be written to the R2 storage device(s). If it is determined at the step 588 that there is no data to be written to the R2 storage device(s), then processing is complete. Otherwise, control transfers from the test step 588 to a step 592 where it is determined if the value of the last aborted sequence no. 462 is relatively old. The test at the step 592 is similar to the test at the step 504, discussed above in connection with the flow chart 500 of FIG. 17. If it is determined at the step 592 that the value of the last aborted sequence no. 462 is relatively old, then control transfers from the test step 592 to a step 594 where the value of the last aborted sequence no. field 462 at the R2 device(s) is set equal to zero.

Following the step 594, or following the step 592 if the value of the last aborted sequence no. field 462 is not rela-tively old is a test step 596 where it is determined if the value of the last aborted sequence no. field 462 is zero. If so, then control transfers from the step 596 to a step 598 where the data is received (e.g., committed to storage) by the R2 device (s). Following the step 598, processing is complete. If it is determined at the test step 596 that the value of the last aborted sequence no. field 462 is not zero, then control transfers from the test step 596 to a test step 602 where it is determined if the sequence number associated with the received data is greater than the value of the last aborted sequence no. field 462. If not, then control transfers from the test step 602 to the step 598, discussed above, where the data is received. Otherwise, if it is determined at the step 602 that the sequence number associated with the data is not greater than the value of the last aborted sequence no. 462, then control transfers from the test step 602 to a step 604 where the data is rejected. In an embodiment herein, rejecting data at the step 604 includes transmitting the value of the last aborted sequence no. field 462 back to the R1 device(s). Following the step 604, processing is complete.

Some of the steps described herein include comparing values and/or comparing a difference between values with a limit. However, as discussed elsewhere herein, the sequence no. field 452, the last aborted sequence no. field 454, and the last aborted sequence no. field 462 may all be of a finite length (e.g., five bytes) and may wrap. Accordingly, the tests at the steps 504, 592 (for example) may include additional processing.

Figure 20:
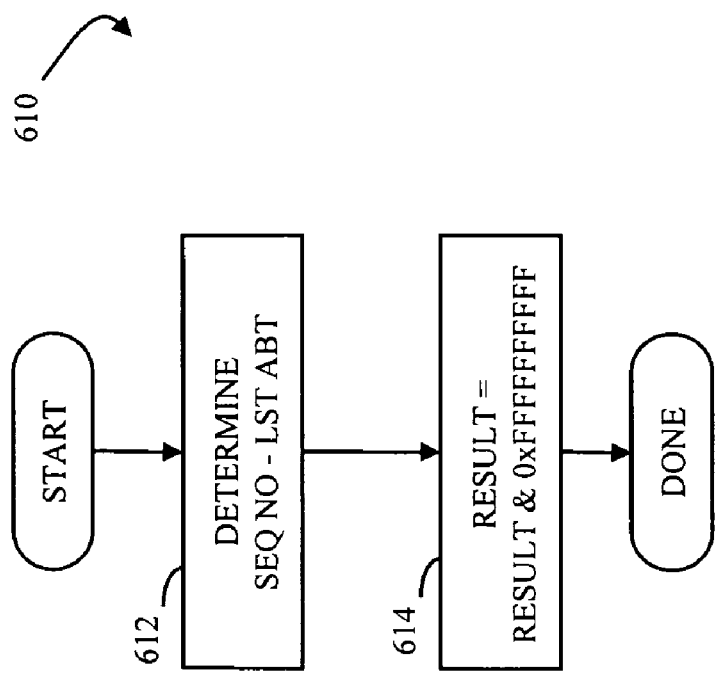
FIG. 20 is a flow chart illustrating steps performed in connection with handling the wrap around of values according to an embodiment of the system described herein.

Referring to FIG. 20, a flow chart 610 illustrates processing performed in connection with the steps 504, 592 to account for the fact that some of the fields wrap. Processing begins at a first step 612 where the difference between the sequence number and the last aborted sequence number is determined. Following the step 612 is a step 614, where result is anded with 0xFFFFFFFFFF (for five byte values) to obtain the absolute value of the result. Following the step 614, processing is complete. Note that similar processing may be used at the step 556 of the flow chart 540 of FIG. 18. Note also that the processing at the step 544, 602 may also be similar, but may take into account the fact that the last aborted sequence number is set to zero when it becomes relatively old.

Although the system described herein uses tracks as a unit of data for certain purposes, it should be understood that other units of data (including, possibly, variable length units of data) may be used. This also applies to other data structures and data units. In addition, in some instances, the order of steps in the flowcharts may be modified, where appropriate. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein. The system also includes computer software, in a computer readable medium, that executes any of the steps described herein.

While the invention has been disclosed in connection with various embodiments, modifications thereon will be readily apparent to those skilled in the art. Accordingly, the spirit and scope of the invention is set forth in the following claims.

What is claimed is:

1. A method of maintaining an ordering of transmitted data, comprising:
 associating a sequence number with each element of a plurality of elements of the transmitted data, wherein the sequence number of each element of the plurality of elements indicates a temporal relationship between different ones of the plurality of elements;

maintaining a last aborted sequence number and an indicator of whether receipt of information indicating that the last aborted sequence number has been acknowledged; and rejecting data associated with a sequence number indicative of a time before a time corresponding to the last aborted sequence number, wherein a sender sends the last aborted sequence number to a receiver that acknowledges receipt thereof, wherein the sender and the receiver each maintain a value for the last aborted sequence number and wherein the receiver returns the last aborted sequence number to the sender in connection with rejecting data provided thereto, and wherein each of the sender and the receiver set the last aborted sequence number of each to zero in response to a difference between the sequence number of at least one of the plurality of elements and the last aborted sequence number being greater than a value representing an expected latency of a network interposed between the sender and the receiver.

2. A method, according to claim 1, wherein the last aborted sequence number is sent until receipt thereof is acknowledged.

3. A method, according to claim 2, wherein a sender sends the last aborted sequence number to a receiver, and wherein the transmitted data is not transmitted to the receiver until receipt of the last aborted sequence number is acknowledged.

4. A method, according to claim 1, wherein the sequence numbers are incremented by one.

5. A method, according to claim 1, further comprising:
adjusting the sequence number of at least one of the plurality of elements and the last aborted sequence number of the sender in response to the last aborted sequence number of the receiver being different than the last aborted sequence number of the sender.

6. A method, according to claim 1, wherein data is accepted by the receiver in response to the last aborted sequence number being equal to zero.

7. A data storage device that maintains an ordering of data transmitted thereto, each element of a plurality of elements of the data having a sequence number associated therewith, the data storage device comprising:

non-volatile memory for storing the data; and at least one director, coupled to the non-volatile memory and having at least one processor and computer software in a computer-readable medium, the software including executable code that maintains a last aborted sequence number and executable code that rejects data associated with a sequence number indicative of a time before a time corresponding to the last aborted sequence number, wherein the last aborted sequence number is set to zero in response to a difference between the sequence number and the last aborted sequence number being greater than a value representing an expected latency of a network to which the data storage device is coupled.

8. A data storage device, according to claim 7, further comprising:
executable code that sends the last aborted sequence number until receipt thereof is acknowledged.

9. A data storage device, according to claim 8, wherein no data is transmitted until receipt of the last aborted sequence number is acknowledged.

10. A data storage device, according to claim 7, wherein the sequence numbers are incremented by one.

11. A data storage device, according to claim 7, further comprising:
executable code that adjusts the sequence number and the last aborted sequence number of the sender in response to the last aborted sequence number of the receiver being different than the last aborted sequence number of the sender.

12. A data storage device, according to claim 7, wherein data is not rejected in response to the last aborted sequence number being equal to zero.

* * * * *